US010473926B2

(12) United States Patent
Lee et al.

(10) Patent No.: US 10,473,926 B2
(45) Date of Patent: Nov. 12, 2019

(54) MULTI-IMAGE DISPLAY APPARATUS INCLUDING DIFFRACTIVE OPTICAL LENS ELEMENT

(71) Applicant: SAMSUNG ELECTRONICS CO., LTD., Suwon-si (KR)

(72) Inventors: Changkun Lee, Seoul (KR); Wontaek Seo, Yongin-si (KR); Geeyoung Sung, Daegu (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/964,888

(22) Filed: Apr. 27, 2018

(65) Prior Publication Data

US 2019/0171005 A1   Jun. 6, 2019

(30) Foreign Application Priority Data

Dec. 4, 2017   (KR) .................. 10-2017-0165233

(51) Int. Cl.
G02B 27/00      (2006.01)
G02B 27/01      (2006.01)
(Continued)

(52) U.S. Cl.
CPC ......... G02B 27/0056 (2013.01); G02B 6/005 (2013.01); G02B 6/0026 (2013.01);
(Continued)

(58) Field of Classification Search
CPC ........ G02B 26/0056; G02B 2027/0107; G02B 2027/0116; G02B 2027/0174;
(Continued)

(56) References Cited

U.S. PATENT DOCUMENTS 5,594,563 A * 1/1997 Larson ..................... G02B 5/26
                                                         348/E9.027
5,835,263 A   11/1998 Dobschal
(Continued)

FOREIGN PATENT DOCUMENTS

CN   107966813 A   4/2018
CN   108347597 A   7/2018
(Continued)

OTHER PUBLICATIONS

Jihwan Kim et al. "Fabrication of ideal geometric-phase holograms with arbitrary wavefronts" Research Article, vol. 2, No. 11, Nov. 4, 2015 (pp. 958-964).

(Continued)

*Primary Examiner* — Peter Radkowski
(74) *Attorney, Agent, or Firm* — Sughrue Mion, PLLC

(57) ABSTRACT

A multi-image display apparatus for augmented reality (AR) or mixed reality (MR) includes a diffractive optical lens element, an image forming device configured to form a first image including a first color image, a second color image, and a third color image, and an optical system configured to transfer the first image and a second image to the diffractive optical lens element, the second image transferred along a path different from a path of the first image. The optical system is configured to offset chromatic aberration of the diffractive optical lens element by providing different optical path lengths for the first color image, the second color image, and the third color image.

40 Claims, 16 Drawing Sheets

(51) Int. Cl.
*G02B 27/14* (2006.01)
*F21V 8/00* (2006.01)
*G02B 27/28* (2006.01)

(52) U.S. Cl.
CPC ............ *G02B 27/00* (2013.01); *G02B 27/01* (2013.01); *G02B 27/0172* (2013.01); *G02B 27/14* (2013.01); *G02B 27/141* (2013.01); *G02B 27/283* (2013.01); *G02B 2027/0107* (2013.01); *G02B 2027/0116* (2013.01); *G02B 2027/0174* (2013.01); *G02B 2027/0178* (2013.01)

(58) Field of Classification Search
CPC ............ G02B 2027/0178; G02B 27/00; G02B 27/0056; G02B 27/01; G02B 27/0172; G02B 27/14; G02B 27/141; G02B 27/283; G02B 6/0026; G02B 6/005
See application file for complete search history.

(56) References Cited

U.S. PATENT DOCUMENTS

| | | | |
|---|---|---|---|
| 6,111,701 A | 8/2000 | Brown | |
| 7,180,837 B2* | 2/2007 | Yi | G11B 7/1275 369/112.08 |
| 7,295,377 B2 | 11/2007 | Edelmann | |
| 9,191,568 B2 | 11/2015 | Peyman | |
| 9,341,850 B1 | 5/2016 | Cakmakci et al. | |
| 9,658,453 B1 | 5/2017 | Kress et al. | |
| 9,857,591 B2* | 1/2018 | Welch | G02B 27/0172 |
| 9,927,614 B2* | 3/2018 | Vallius | G02B 3/14 |
| 2004/0233827 A1* | 11/2004 | Yi | G11B 7/1275 369/121 |
| 2006/0152436 A1* | 7/2006 | Kowarz | G02B 26/0808 345/30 |
| 2008/0231925 A1* | 9/2008 | Tateishi | G11B 7/0065 359/21 |
| 2010/0245773 A1* | 9/2010 | Arita | G02B 27/1033 353/31 |
| 2011/0002019 A1* | 1/2011 | Routley | G02B 27/48 359/9 |
| 2011/0251905 A1* | 10/2011 | Lawrence | G03H 1/0005 705/15 |
| 2013/0242392 A1 | 9/2013 | Amirparivez et al. | |
| 2014/0146092 A1* | 5/2014 | Toyooka | H04N 9/3155 345/690 |
| 2015/0346495 A1* | 12/2015 | Welch | G02B 27/0172 345/8 |
| 2015/0355468 A1* | 12/2015 | Osterhout | G06F 3/012 345/633 |
| 2016/0011353 A1 | 1/2016 | Escuti et al. | |
| 2016/0025992 A1* | 1/2016 | Van Der Zouw | G01N 21/8806 250/216 |
| 2016/0327789 A1* | 11/2016 | Klug | G02B 27/0101 |
| 2017/0115484 A1 | 4/2017 | Yokoyama | |
| 2017/0184848 A1* | 6/2017 | Vallius | G02B 3/14 |
| 2017/0339378 A1* | 11/2017 | Okumura | G02B 5/003 |
| 2018/0107000 A1 | 4/2018 | Sung et al. | |
| 2018/0210222 A1 | 7/2018 | Seo et al. | |

FOREIGN PATENT DOCUMENTS

| | | |
|---|---|---|
| DE | 195 25 520 A1 | 1/1997 |
| DE | 103 16 533 A1 | 11/2004 |
| EP | 1118905 A2 | 7/2001 |
| EP | 3312659 A1 | 4/2018 |
| GB | 2479643 A | 10/2011 |
| JP | 63-58317 A | 3/1988 |
| JP | 3-107119 A | 5/1991 |
| JP | 2001183605 A | 7/2001 |
| JP | 3413885 B2 | 6/2003 |
| WO | 98/15868 A1 | 4/1998 |
| WO | 2006/070723 A1 | 7/2006 |
| WO | 2008/129539 A2 | 10/2008 |
| WO | 2009/094399 A1 | 7/2009 |
| WO | 2014159045 A1 | 10/2014 |

OTHER PUBLICATIONS

Communication dated Mar. 8, 2019, issued by the European Patent Office in counterpart European Application No. 18185773.1.
Communication dated Jul. 12, 2019 issued by the European Intellectual Property Office in counterpart European Application No. 18185773.1.

* cited by examiner

MULTI-IMAGE DISPLAY APPARATUS
INCLUDING DIFFRACTIVE OPTICAL LENS
ELEMENT

CROSS-REFERENCE TO RELATED
APPLICATION

This application claims priority from Korean Patent Application No. 10-2017-0165233, filed on Dec. 4, 2017 in the Korean Intellectual Property Office, the disclosure of which is incorporated herein in its entirety by reference.

BACKGROUND

1. Field

One or more example embodiments of the present disclosure relate to a multi-image display apparatus such as an augmented reality system, and more particularly, to a multi-image display apparatus providing a wide angle of view using a diffractive optical lens element while reducing the chromatic aberration of the diffractive optical lens element.

2. Description of the Related Art

Recently, along with the development of electronic apparatuses and display apparatuses capable of implementing virtual reality (VR), interest in such apparatuses has increased. As a next step of VR, technology for implementing augmented reality (AR) and mixed reality (MR) has been researched.

Unlike VR that is based on a complete virtual world, AR is a display technique that shows the real world with overlapped or combined virtual objects or information thereon, thereby further increasing the effect of reality. While VR is generally applied to fields such as games or virtual experience, AR is advantageous in that it may be applied to various real environments. In particular, AR attracts attention as next-generation display technology suitable for a ubiquitous environment or an Internet of things (IoT) environment. AR may be an example of MR in that it shows a mixture of the real world and additional information such as a virtual world.

SUMMARY

One or more example embodiments provide a multi-image display apparatus such as an augmented reality system, and more particularly, a multi-image display apparatus providing a wide angle of view using a diffractive optical lens element while reducing the chromatic aberration of the diffractive optical lens element.

According to an aspect of an example embodiment, there is provided a multi-image display apparatus including a diffractive optical lens element, wherein a focal length of the diffractive optical lens element varies based on a wavelength and a polarization state of incident light, an image forming device configured to form a first image comprising a first color image, a second color image, and a third color image, and an optical system configured to transfer the first image and a second image to the diffractive optical lens element, the second image being transferred along a path different from a path the first image is transferred, wherein the optical system is configured to offset chromatic aberration of the diffractive optical lens element by providing different optical path lengths for the first color image, the second color image, and the third color image.

The diffractive optical lens element may be configured to condense light having a first polarization state and transmit without refraction light having a second polarization state.

The optical system may be further configured polarize the first image and the second image, wherein the first image incident on the diffractive optical lens element is in the first polarization state and the second image incident on the diffractive optical lens element is in the second polarization state.

The diffractive optical lens element may have a first focal length with respect to the first color image, a second focal length with respect to the second color image greater than the first focal length, and a third focal length with respect to the third color image greater than the second focal length, wherein the first color image has a first optical path length, the second color image has a second optical path length greater than the first optical path length, and the third color image has a third optical path length greater than the second optical path length.

The multi-image display apparatus, wherein along an optical path of the first image, the optical system may focus the first color image at a first position with respect to the diffractive optical lens element, the second color image at a second position farther away from the diffractive optical lens element than the first position, and the third color image at a third position farther away from the diffractive optical lens element than the second position, wherein the diffractive optical lens element focuses the first color image, the second color image, and the third color image on a same plane.

The optical system may include a first beam splitter configured to transmit or reflect incident light based a polarization state of the incident light, a dichroic mirror stack facing a first surface of the first beam splitter, a lens facing a second surface of the first beam splitter and configured to focus the first color image, the second color image, and the third color image reflected from the dichroic mirror stack at different positions along an optical path of the first image, and a second beam splitter configured to reflect the first image to the diffractive optical lens element and transmit the second image to the diffractive optical lens element.

The image forming device may include a light source facing a third surface of the first beam splitter, the third surface being opposite to the second surface of the first beam splitter, and a spatial light modulator facing a fourth surface of the first beam splitter, the fourth surface being opposite to the first surface of the first beam splitter.

The dichroic mirror stack may include a first dichroic mirror, disposed on the first surface of the beam splitter, configured to reflect the first color image and transmit the second color image and the third color image, a second dichroic mirror, disposed on the first dichroic mirror, configured to reflect the second color image and transmit the third color image, and a third dichroic mirror, disposed on the second dichroic mirror, configured to reflect the third color image, wherein the first to third dichroic mirrors are sequentially disposed in a direction away from the first surface of the beam splitter.

The optical system may further include a quarter-wave plate between the first beam splitter and the dichroic mirror stack.

The optical system may further include a quarter-wave plate between the second beam splitter and the diffractive optical lens element.

The optical system may further include a polarizing plate disposed in an optical path of the second image to select a polarization state of the second image incident on the second beam splitter.

The image forming device may include a display panel.

The optical system may include a first dichroic mirror configured to reflect the first color image to the diffractive optical lens element and transmit the second color image and the third color image, a second dichroic mirror configured to reflect the second color image to the diffractive optical lens element and transmit the third color image, and a third dichroic mirror configured to reflect the third color image to the diffractive optical lens element, wherein the first to third dichroic mirrors are sequentially disposed in a direction away from the diffractive optical lens element.

The second dichroic mirror may be spaced apart from the first dichroic mirror, and the third dichroic mirror is spaced apart from the second dichroic mirror.

The first dichroic mirror may include a first surface reflecting the first color image and a second surface transmitting the second image, the second dichroic mirror may include a first surface reflecting the second color image and a second surface transmitting the second image, and the third dichroic mirror may include a first surface reflecting the third color image and a second surface transmitting the second image.

The optical system may include a beam splitter configured to reflect the first image to the diffractive optical lens element and transmit the second image, a first dichroic mirror configured to reflect the first color image to the beam splitter and transmit the second color image and the third color image, a second dichroic mirror configured to reflect the second color image to the beam splitter and transmit the third color image, and a third dichroic mirror configured to reflect the third color image to the beam splitter, wherein the first to third dichroic mirrors are sequentially disposed in a direction away from the diffractive optical lens element.

The first to third dichroic mirrors may be sequentially disposed in a direction away from the beam splitter, wherein the second dichroic mirror is spaced apart from the first dichroic mirror, and the third dichroic mirror is spaced apart from the second dichroic mirror.

The multi-image display apparatus may further include a lens element disposed in an optical path of the first image between the image forming device and the beam splitter, wherein the lens element is configured to focus the first color image, the second color image, and the third color image at different positions in the optical path of the first image.

The optical system may include a beam splitter configured to reflect the first image to the diffractive optical lens element and transmit the second image, a first lens element disposed in an optical path of the first image between the image forming device and the beam splitter and configured to focus the first image, and a second lens element disposed in the optical path of the first image between the image forming device and the beam splitter, wherein the second lens element includes a dispersion value greater than a dispersion value of the first lens element and configured to split the first image into the first color image, the second color image, and the third color image.

The dispersion value of the second lens element may be determined to offset chromatic aberration of the diffractive optical lens element.

The optical system may further include a mirror disposed in the optical path of the first image between the image forming device and the beam splitter, wherein the mirror is configured to reflect the first image to the beam splitter.

The optical system may include a grating element configured to reflect the first image to the diffractive optical lens element and transmit the second image, wherein the grating element is configured to converge the first color image at a first angle, the second color image at a second angle greater than the first angle, and the third color image at a third angle greater than the second angle.

The grating element may include a hologram grating or a surface relief grating.

The optical system may include a first diffusion plate configured to reflect and diffuse the first color image toward the diffractive optical lens element and transmit the second color image and the third color image, a second diffusion plate configured to reflect and diffuse the second color image toward the diffractive optical lens element and transmit the third color image, and a third diffusion plate configured to reflect and diffuse the third color image toward the diffractive optical lens element, wherein the first to third diffusion plates are sequentially disposed in a direction away from the diffractive optical lens element.

The second diffusion plate may be spaced apart from the first diffusion plate, and the third diffusion plate is spaced apart from the second dichroic mirror.

The first diffusion plate may have a first surface reflecting and diffusing the first color image and a second surface transmitting the second image, the second diffusion plate has a first surface reflecting and diffusing the second color image and a second surface transmitting the second image, and the third diffusion plate has a first surface reflecting and diffusing the third color image and a second surface transmitting the second image.

The optical system may include a dichroic mirror stack facing the display panel, a first beam splitter placed between the display panel and the dichroic mirror stack and configured to transmit or reflect incident light based on a polarization state of the incident light, and a second beam splitter configured to reflect the first image to the diffractive optical lens element and transmit the second image, wherein the dichroic mirror stack includes a first dichroic concave mirror configured to reflect and condense the first color image and transmit the second color image and the third color image, a second dichroic concave mirror configured to reflect and condense the second color image and transmit the third color image, and a third dichroic concave mirror configured to reflect and condense the third color image, wherein the first to third dichroic concave mirrors are sequentially disposed in a direction away from the first beam splitter.

The optical system may include a light guide plate including a first entrance surface on which the first image is incident, a second entrance surface on which the second image is incident, an exit surface through which the first image and the second image are output, and an inclined surface facing the first entrance surface, wherein the light guide plate is configured to transfer light from the first entrance surface to the exit surface, and a dichroic mirror stack disposed on the inclined surface of the light guide plate.

The dichroic mirror stack may include a first dichroic mirror configured to reflect the first color image and transmit the second color image and the third color image, a second dichroic mirror configured to reflect the second color image and transmit the third color image, and a third dichroic mirror configured to reflect the third color image, wherein the first to third dichroic mirrors are sequentially disposed in a direction away from the inclined surface of the light guide plate.

The diffractive optical lens element may be disposed on the exit surface of the light guide plate.

The optical system may further include a diffractive grating disposed on the second entrance surface of the light guide plate opposite the exit surface of the light guide plate, wherein the diffractive grating is configured to reflect incident light perpendicularly toward the exit surface of the light guide plate.

The optical system may further include a half mirror placed inside the light guide plate and facing the exit surface of the light guide plate, the half mirror comprising an aspherical reflective surface.

The image forming device may include a first display panel configured to form the first color image, a second display panel configured to form the second color image, and a third display panel configured to form the third color image.

The optical system may include a first beam splitter configured in a rectangular parallelepiped shape, the first beam splitter comprising a first entrance surface facing the first display panel, a second entrance surface facing the second display panel, a third entrance surface facing the third display panel, and an exit surface, and a second beam splitter configured to reflect the first image to the diffractive optical lens element and transmit the second image.

The multi-image display apparatus, wherein a second distance between the second display panel and the second entrance surface may be greater than a first distance between the first display panel and the first entrance surface, and a third distance between the third display panel and the third entrance surface may be greater than the second distance between the second deposition and the second entrance surface.

The optical system may further include a second quarter-wave plate between the first beam splitter and the spatial light modulator.

According to an aspect of an example embodiment, there is provided a multi-image display apparatus including a diffractive optical lens element having a focal length varying based on a wavelength, a first image forming device configured to form a first image comprising a first color image, a second color image, and a third color image, a second image forming device configured to form a second image, and an optical system configured to provide the first color image having a first optical path length, a second color image having a second optical path length, and the third color image having a third optical path length, the first, second, and third optical path lengths being of different lengths, and to transfer the first image formed by the first image forming device and the second image formed by the second image forming device to the diffractive optical lens element, wherein the diffractive optical lens element is configured to focus the first color image, the second color image, and the third color image included in the first image on a same plane.

The optical system may include a first beam splitter configured to transmit or reflect incident light based a polarization state of the incident light from the first image forming device, a dichroic mirror stack facing a first surface of the first beam splitter, a lens facing a second surface of the first beam splitter and configured to focus the first color image, the second color image, and the third color image reflected from the dichroic mirror stack at different positions along an optical path of the first image, and a second beam splitter configured to reflect the first image to the diffractive optical lens element and transmit the second image to the diffractive optical lens element.

The dichroic mirror stack may include a first dichroic mirror, disposed on the first surface of the beam splitter, configured to reflect the first color image and transmit the second color image and the third color image, a second dichroic mirror, disposed on the first dichroic mirror, configured to reflect the second color image and transmit the third color image, and a third dichroic mirror, disposed on the second dichroic mirror, configured to reflect the third color image.

The diffractive optical lens element may have a first focal length with respect to the first color image, a second focal length with respect to the second color image that is greater than the first focal length, and a third focal length with respect to the third color image that is greater than the second focal length, and the second optical path length may be greater than the first optical path length, and the third optical path length may be greater than the second optical path length.

BRIEF DESCRIPTION OF THE DRAWINGS

The above and other aspects will become apparent and more readily appreciated from the following description of the example embodiments, taken in conjunction with the accompanying drawings in which.

DETAILED DESCRIPTION

Figure 1:
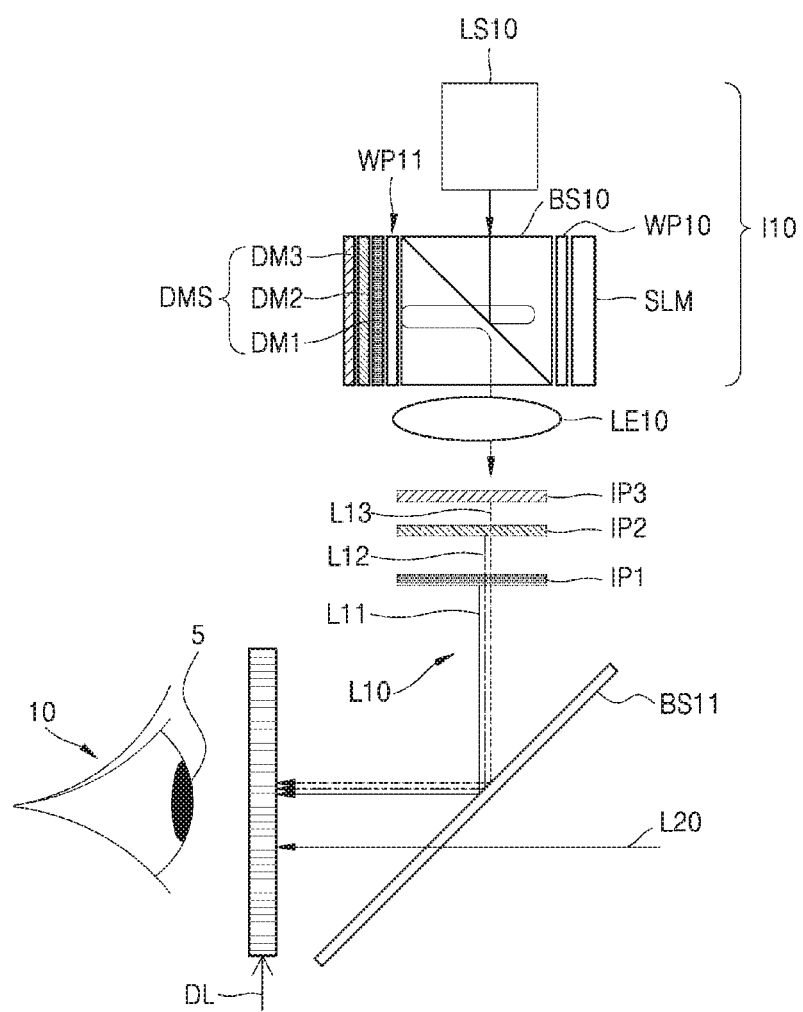
FIG. 1 is a schematic view illustrating a configuration of a multi-image display apparatus according to an example embodiment.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the present disclosure, it will be further understood that the terms "comprises" and/or "comprising" used herein specify the presence of stated features or elements, but do not preclude the presence or addition of one or more other features or elements.

Hereinafter, multi-image display apparatuses including diffractive optical lens elements will be described with reference to the accompanying drawings. In the drawings, like reference numerals refer to like elements, and the sizes of elements may be exaggerated for clarity of illustration. Example embodiments described herein are for illustrative purposes only, and various modifications may be made therefrom. In the following description, when an element is referred to as being "above" or "on" another element in a layered structure, it may be directly on an upper, lower, left, or right side of the other element while making contact with the other element or may be above an upper, lower, left, or right side of the other element without making contact with the other element.

FIG. 1 is a schematic view illustrating a configuration of a multi-image display apparatus according to an example embodiment. Referring to FIG. 1, the multi-image display apparatus of the example embodiment may include a diffractive optical lens element DL configured to focus images, an image forming device 110 configured to form a first image L10, and an optical system OS configured to transfer the first image L10 and a second image L20 to the diffractive optical lens element DL, the second image L20 coming along a path different from a path along which the first image L10 comes.

For example, the first image L10 may be a 'display image' formed and provided by the image forming device 110 in the multi-image display apparatus and including virtual reality or virtual information. The second image L20 may be an image of the real world outside that a user faces. The second image L20 may include an image of a foreground that the user faces, and a background subject. The second image L20 may be an image of the real world. Therefore, the multi-image display apparatus of the example embodiment may be used for implementing augmented reality (AR) or mixed reality (MR). In this case, the multi-image display apparatus may be a near-eye AR display apparatus.

The image forming device 110 may include a light source LS10 and a spatial light modulator SLM. In addition, for example, the spatial light modulator SLM may include a semiconductor modulator based on a compound semiconductor such as gallium arsenide (GaAs), a liquid crystal on silicon (LCoS) panel, a liquid crystal display (LCD) panel, a digital light projection (DLP) panel, or the like. The image forming device 110 may form the first image L10 using the light source LS10 and the spatial light modulator SLM. The light source LS10 may, for example, include a plurality of light-emitting diodes or a plurality of laser diodes capable of emitting red light, green light, and blue light, respectively. Therefore, the first image L10 formed by the image forming device 110 may include a red image, a green image, and a blue image.

The optical system OS may transfer light emitted from the light source LS10 to the spatial light modulator SLM, and transferring the first image L10 formed by the spatial light modulator SLM to the diffractive optical lens element DL. To this end, the optical system OS may, for example, include a first beam splitter BS10, a dichroic mirror stack DMS, a lens element LE10, and a second beam splitter B11. The first beam splitter BS10 may include four optical surfaces through which light is incident or output. For example, the dichroic mirror stack DMS may face a first surface of the first beam splitter BS10, the lens element LE10 may face a second surface of the first beam splitter BS10, the light source LS10 may face a third surface of the first beam splitter BS10, which is opposite the second surface, and the spatial light modulator SLM may face a fourth surface of the first beam splitter BS10, which is opposite the first surface.

The first beam splitter BS10 may be a polarization beam splitter configured to transmit or reflect incident light according to the polarization state of the incident light. For example, the first beam splitter BS10 may reflect a first linear polarization component of light and may transmit a second linear polarization component of the light. In this case, a first quarter-wave plate WP10 may be placed between the fourth surface of the first beam splitter BS10 and the spatial light modulator SLM, and a second quarter-wave plate WP11 may be further placed between the first surface of the first beam splitter BS10 and the dichroic mirror stack DMS.

In this case, the first linear polarization component of light emitted from the light source LS10 may be reflected by the first beam splitter BS10 and may be incident on the spatial light modulator SLM through the first quarter-wave plate WP10. The second linear polarization component of the light may intactly pass without changing through the first beam splitter BS10. Alternatively, the light source LS10 may be configured to emit light having only the first polarization component. A polarizing plate configured to transmit only the first polarization component of light may be further placed between the light source LS10 and the third surface of the first beam splitter BS10.

The first quarter-wave plate WP10 may convert linearly polarized light into circularly polarized light, or circularly polarized light into linearly polarized light. For example, the first quarter-wave plate WP10 may convert the first linear polarization component of light into a first circular polarization component or the first circular polarization component of light into the first linear polarization component, and may convert the second linear polarization component of light into a second circular polarization component or the second circular polarization component of light into the second linear polarization component. Therefore, the first circular polarization component of light may be incident on the spatial light modulator SLM. The first circular polarization component of light incident on the spatial light modulator SLM receives the first image L10. In addition, as light is reflected by the spatial light modulator SLM, the light is converted into the second circular polarization component, and then passes through the first quarter-wave plate WP10. Then, the light may be converted to a light having a second linear polarization component, and may pass through the first beam splitter BS10.

The light having the second linear polarization component passing through the first beam splitter BS10 is incident on the dichroic mirror stack DMS through the first surface of the first beam splitter BS10 and the second quarter-wave plate WP11. The light having the second linear polarization component is converted to the second circular polarization component by the second quarter-wave plate WP11. The dichroic mirror stack DMS may include a first dichroic mirror DM1 configured to reflect a red image and transmit a green image and a blue image, a second dichroic mirror DM2 configured to reflect the green image and transmit the red image and the blue image, and a third dichroic mirror DM3 configured to reflect the blue image and transmit the red image and the green image. The first to third dichroic mirrors DM1 to DM3 may be sequentially stacked in a direction away from the first surface of the first beam splitter BS10. In other words, the first to third dichroic mirrors DM1 to DM3 may be sequentially stacked to form the dichroic mirror stack DMS, and the dichroic mirror stack DMS may be placed such that the first dichroic mirror DM1 is closest to the first surface of the first beam splitter BS10.

The red image, the green image, and the blue image respectively reflected by the first to third dichroic mirrors DM1 to DM3 have the first circular polarization component, and as passing through the second quarter-wave plate WP11, the red, green, and blue images may have the first linear polarization component. Therefore, the red, green, and blue images are reflected by the first beam splitter BS10 in a direction toward the second beam splitter BS11.

The lens element LE10 may be further placed between the second surface of the first beam splitter BS10 and the second beam splitter BS11 to focus the red, green, and blue images. In the dichroic mirror stack DMS, the positions of the first to third dichroic mirrors DM1 to DM3 are different, and thus, the lens element LE10 may focus the red, green, and blue images at different positions along an optical path. For example, as shown in FIG. 1, among the first to third dichroic mirrors DM1 to DM3, the first dichroic mirror DM1 is closest to the lens element LE10, and the third dichroic mirror DM3 is farthest from the lens element LE10. Therefore, a red image L11 is focused on a first image plane IP1 farthest from the lens element LE10, a green image L12 is focused on a second image plane IP2, and a blue image L13 is focused on a third image plane IP3 closest to the lens element LE10. In other words, the first image plane IP1 on which the red image L11 is focused by the lens element LE10 is closest to the diffractive optical lens element DL, and the third image plane IP3 on which the blue image L13 is focused by the lens element LE10 is farthest from the diffractive optical lens element DL.

Thereafter, the first image L10 including the red image L11, the green image L12, and the blue image L13 is reflected by the second beam splitter BS11 to the diffractive optical lens element DL. The second beam splitter BS11 may be a polarization beam splitter configured to transmit or reflect incident light according to the polarization state of the incident light or may be a simple half mirror configured to transmit half of incident light and reflect the other half of the incident light. If the second beam splitter BS11 is a polarization beam splitter, the second beam splitter BS11 may be configured to reflect the first linear polarization component of light and transmit the second linear polarization component of the light. Since the first image L10 reflected by the first beam splitter BS10 to the second beam splitter BS11 has the first linear polarization component, the first image L10 may be reflected by the second beam splitter BS11 substantially without loss.

In this manner, the optical system OS may transfer the first image L10 to the diffractive optical lens element DL. In addition, the optical system OS may transfer the second image L20, coming along a path different from the path of the first image L10, to the diffractive optical lens element DL. For example, FIGS. 2 to 4 illustrate example embodiments of the optical system OS of the multi-image display apparatus shown in FIG. 1, and operational principles in the example embodiments.

Figure 2:
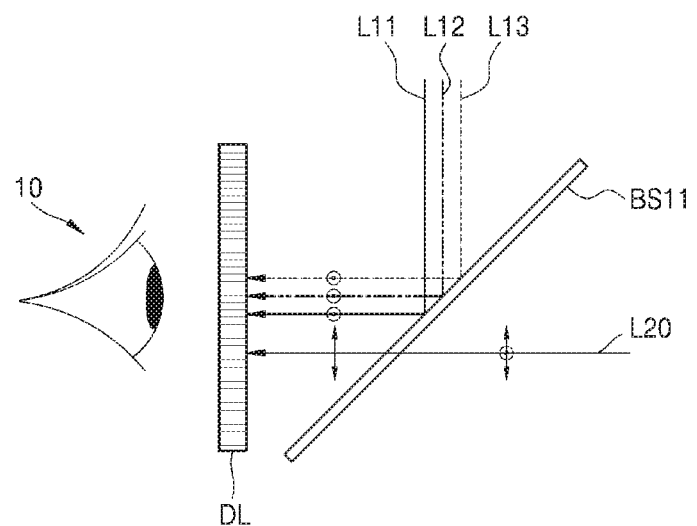
FIGS. 2 to 4 are views illustrating various example embodiments and operational principles of an optical system of the multi-image display apparatus shown in FIG. 1.

First, referring to FIG. 2, the second beam splitter BS11 may be a polarization beam splitter configured to reflect the first linear polarization component of light and transmit the second linear polarization component of the light. The first image L10 having the first linear polarization component is incident on a first surface of the second beam splitter BS11 and reflected at a right angle. The second image L20 having both the first and second linear polarization components is incident on a second surface of the second beam splitter BS11, which is opposite the first surface of the second beam splitter BS11. The first linear polarization component of the second image L20 is reflected by the second surface of the second beam splitter BS11, and the second linear polarization component of the second image L20 passes through the second surface of the second beam splitter BS11 and reaches the diffractive optical lens element DL. Therefore, the optical system OS may control the polarization state of the first image L10 and the second image L20 in such a manner that the first image L10 having the first linear polarization component and the second image L20 having the second linear polarization component may be incident on the diffractive optical lens element DL.

Figure 3:
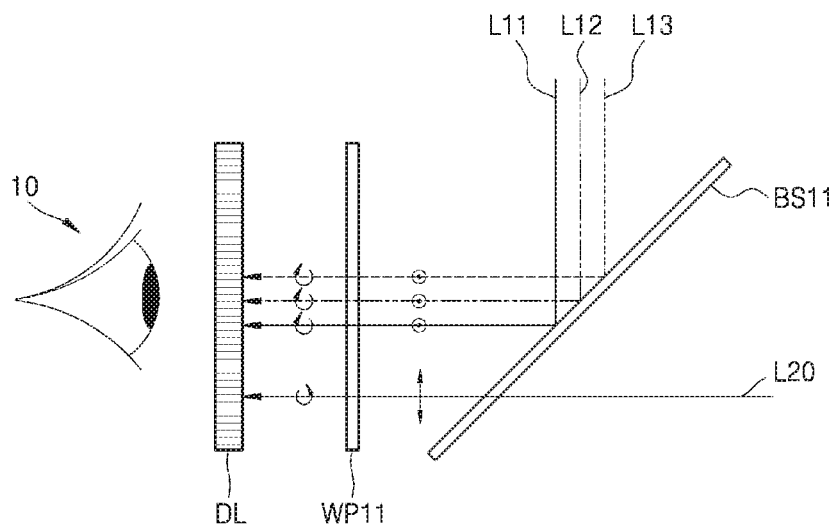

In addition, referring to FIG. 3, the optical system OS may further include a third quarter-wave plate WP11 between the second beam splitter BS11 and the diffractive optical lens element DL. The third quarter-wave plate WP11 may convert the first linear polarization component of light into the first circular polarization component or the first circular polarization component of the light into the first linear polarization component, and may convert the second linear polarization component of light into the second circular polarization component or the second circular polarization component of light into the second linear polarization component. Therefore, the third quarter-wave plate WP11 may convert the first linear polarization component of the first image L10 into the first circular polarization component, and the second linear polarization component of the second image L20 into the second circular polarization component. In this case, the first image L10 having the first circular polarization component and the second image L20 having the second circular polarization component may be incident on the diffractive optical lens element DL.

Figure 4:
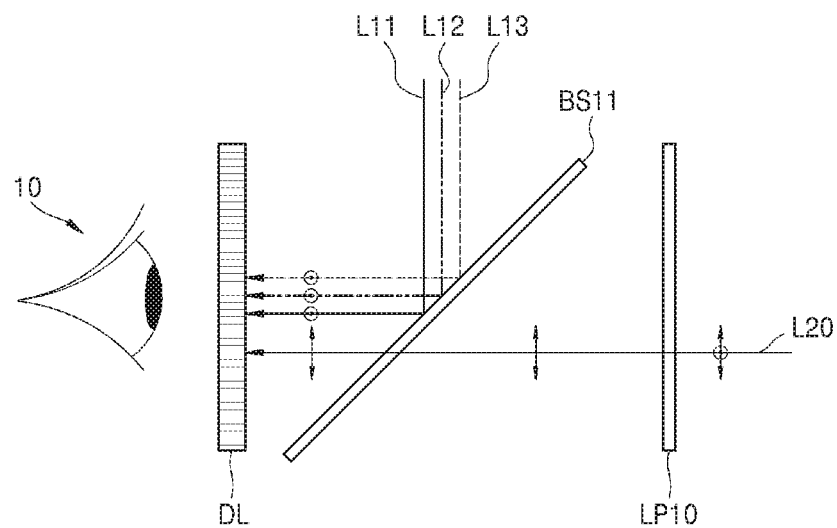

Referring to FIG. 4, the second beam splitter BS11 may be a simple half mirror. In this case, the optical system OS may further include a polarizing plate LP10 placed in an optical path of the second image L20 on one side of the beam splitter BS11 opposite to the diffractive optical lens element DL to select the polarization state of the second image L20 incident on the second beam splitter BS11. For example, the polarizing plate LP10 may block the first linear polarization component of light and transmit the second linear polarization component of the light. In this configuration, a portion of the first image L10 having the first linear polarization component passes through the first surface of the second beam splitter BS11, and the portion of the first image L10 having the second linear polarization component is reflected by the first surface of the second beam splitter BS11 at about a right angle to the diffractive optical lens element DL. The second image L20 having both the first and second linear polarization components is polarized to have only the second linear polarization component after passing through the polarizing plate LP10. Thereafter, the second image L20 with only the second linear polarization passes through the second surface of the second beam splitter BS11 and reaches the diffractive optical lens element DL. Therefore, the first image L10 having the first linear polarization component and the second image L20 having the second linear polarization component may be incident on the diffractive optical lens element DL.

The diffractive optical lens element DL is configured to have a focal length varying according to the polarization state of incident light. For example, in the embodiments shown in FIGS. 2 and 4, the diffractive optical lens element DL may be configured as a convex lens having a positive (+) refractive power with respect to light having the first linear polarization component. In addition, the diffractive optical lens element DL may have substantially an infinite focal length with respect to light having the second linear polarization component. In other words, the diffractive optical lens element DL may be configured as a flat plate intactly transmitting light having the second linear polarization component without refracting the light. However, in the example embodiment shown in FIG. 3, the diffractive optical lens element DL may be configured as a convex lens having a positive (+) refractive power with respect to light having the first circular polarization component and as a flat plate with respect to light having the second circular polarization component. Therefore, the diffractive optical lens element DL may condense the first image L10 having the first linear polarization component or the first circular polarization component on an ocular organ 10 of a user, particularly, a pupil 5. In addition, the diffractive optical lens element DL may transfer the second image L20 having the second linear polarization component or the second circular polarization component to the ocular organ 10 of the user without distortion.

For example, if the first image L10 is a virtual display image, and the second image L20 is a real world image (outside image), the diffractive optical lens element DL may be configured as a convex lens with respect to the virtual display image to increase the angle of view and as a flat plate with reference to the outside image to prevent or reduce image distortion. As described above, since the diffractive optical lens element DL has characteristics dependent on the polarization state of incident light, the above-stated effects may be obtained.

In a conventional see-through type display apparatus, a lens may not be used in front of a user's eye so that the user may see outside images without distortion. In other words, a lens distorting outside images may not be placed between the user's eye and an outside foreground. Therefore, a lens for seeing a virtual display image needs to be placed outside a region between the user's eye and the outside foreground, such as avoidance placement. However, in the conventional see-through type display apparatus, since an optical path between the user's eye and the lens increases, the angle of view decreases.

However, according to the example embodiments, the diffractive optical lens element DL is used in such a manner that the diffractive optical lens element DL operates as a convex lens with respect to a virtual display image and as a flat plate with respect to an real world outside image. Therefore, as the optical path between the ocular organ 10 of the user and the diffractive optical lens element DL is shortened, a wide angle of view may be more easily secured for a virtual display image. In addition, since the diffractive optical lens element DL operates as a flat plate with respect to an real world outside image, the outside image may be seen without or with less distortion. For example, according to the example embodiments, the multi-image display apparatus may provide a wide angle of view equal to or greater than about 60°. Owing to the wide angle of view for a virtual display image, the view angle difference between the virtual display image and a real outside foreground may be reduced, thereby providing a more realistic AR.

The diffractive optical lens element DL having a focal length varying according to the polarization state of incident light may be implemented by forming a pattern of a plurality of nonlinear material elements on a transparent substrate. For example, a two-dimensional (2D) or three-dimensional (3D) pattern of fine nonlinear material elements such as liquid crystal polymer elements may impart polarization-dependent characteristics to the diffractive optical lens element DL. However, the diffractive optical lens element DL has chromatic aberration because of the effect of dispersion occurring according to wavelengths. The focal length of a general refractive lens increases in proportion to the wavelength of light. On the other hand, the focal length of a diffractive lens is inversely proportionately to the wavelength of light. Therefore, as the wavelength of incident light increases, the focal length of the diffractive optical lens element DL decreases, and the focal length of the diffractive optical lens element DL varies with relatively small change in wavelength. For example, the diffractive optical lens element DL may have a first focal length with respect to the red image L11, a second focal length greater than the first focal length with respect to the green image L12, and a third focal length greater than the second focal length with respect to the blue image L13.

In the example embodiment, the first to third dichroic mirrors DM1 to DM3 of the dichroic mirror stack DMS are arranged at different positions such that optical paths of the red image L11, the green image L12, and the blue image L13 may have different lengths to offset the chromatic aberration of the diffractive optical lens element DL. For example, the first to third dichroic mirrors DM1 to DM3 may be sequentially stacked in a direction away from the first surface of the first beam splitter BS10. Then, the red image L11 may have a first optical path length, the green image L12 may have a second optical path length greater than the first optical path length, and the blue image L13 may have a third optical path length greater than the second optical path length. Furthermore, in an optical path of the first image L10, the lens element LE10 may form the red image L11 at a first position with respect to the diffractive optical lens element DL, the green image L12 at a second position more distant from the diffractive optical lens element DL than the first position, and the blue image L13 at a third position more distant from the diffractive optical lens element DL than the second position.

The distances between the first to third dichroic mirrors DM1 to DM3 and the focal length of the lens element LE10 are determined by considering the chromatic aberration of the diffractive optical lens element DL to offset the chromatic aberration. In this regard, the dichroic mirror stack DMS and the lens element LE10 may be considered as color separating elements configured to split the first image L10 into the red image L11, the green image L12, and the blue image L13 and form the red image L11, the green image L12, and the blue image L13 at different positions in an optical path. Then, the diffractive optical lens element DL may focus the red image L11, the green image L12, and the blue image L13 on the same plane. Therefore, the user may see the first image L10 with reduced chromatic aberration.

Figure 5:
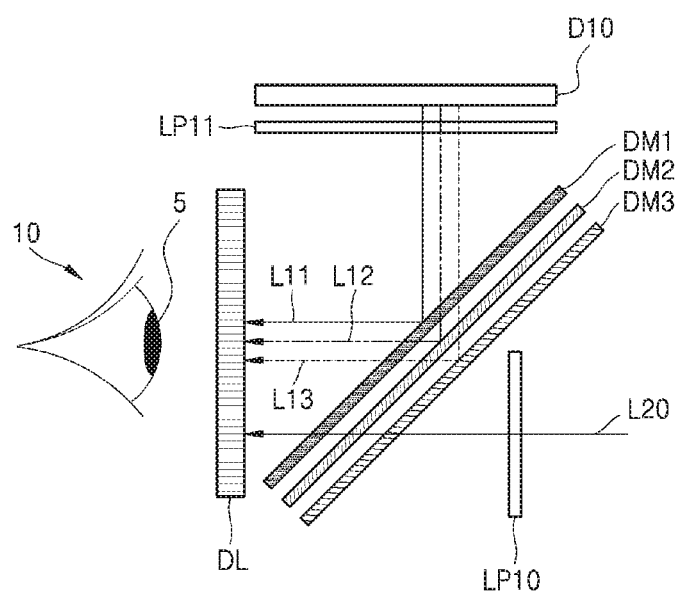
FIG. 5 is a schematic view illustrating a configuration of a multi-image display apparatus according to an example embodiment.

FIG. 5 is a schematic view illustrating a configuration of a multi-image display apparatus according to an example embodiment. Referring to FIG. 5, the multi-image display apparatus may include a display panel D10 as an image forming device configured to form a first image L10. For example, the display panel D10 may include a micro light-emitting diode (LED) display panel, an organic LED (OLED) display panel, or a liquid crystal display (LCD) panel. The first image L10 embodied by using the display panel D10 may be a 2D image or a 3D image, and examples of the 3D image may include a hologram image, a stereo image, a light field image, or an integral photography (IP) image.

To transfer the first image L10 to a diffractive optical lens element DL, an optical system OS may include: a first dichroic mirror DM1 configured to reflect a red image L11 toward the diffractive optical lens element DL and transmit a green image L12 and a blue image L13; a second dichroic mirror DM2 configured to reflect the green image L12 toward the diffractive optical lens element DL and transmit the blue image L13; and a third dichroic mirror DM3 configured to reflect the blue image L13 toward the diffractive optical lens element DL. The first to third dichroic mirrors DM1 to DM3 may be inclined with respect to the diffractive optical lens element DL and may bend an optical path of the first image L10 between the display panel D10 and the diffractive optical lens element DL by an angle of about 90°. In addition, the optical system OS may further include a lens element LE10 placed between the display panel D10 and the first dichroic mirror DM1 to focus the first image L10.

Furthermore, to transfer a second image L20 to the diffractive optical lens element DL, the first dichroic mirror DM1 may include a first surface configured to reflect the red image L11 and a second surface configured to transmit the second image L20; the second dichroic mirror DM2 may include a first surface configured to reflect the green image L12 and a second surface configured to transmit the second image L20; and the third dichroic mirror DM3 may include a first surface configured to reflect the blue image L13 and a second surface configured to transmit the second image L20. Therefore, the first to third dichroic mirrors DM1 to DM3 may operate as a color separating element and a beam splitter as well. Then, the second image L20 may sequentially pass through the third dichroic mirror DM3, the second dichroic mirror DM2, and the first dichroic mirror DM1 and may reach the diffractive optical lens element DL.

In addition, to guide the first image L10 having a first linear polarization component and the second image L20 having a second linear polarization component to the diffractive optical lens element DL, the optical system OS may further include a first polarizing plate LP10 placed in an optical path of the second image L20 and configured to transmit only light having the second linear polarization component and a second polarizing plate LP11 placed in an optical path of the first image L10 and configured to transmit only light having the first linear polarization component. For example, the first polarizing plate LP10 may face the second surface of the third dichroic mirror DM3, and the second polarizing plate LP11 may be placed between the display panel D10 and the first dichroic mirror DM1.

To offset the chromatic aberration of the diffractive optical lens element DL, the first to third dichroic mirrors DM1 to DM3 may be sequentially arranged in a direction away from the diffractive optical lens element DL. For example, the first dichroic mirror DM1 is closest to the diffractive optical lens element DL. Then, the second dichroic mirror DM2 is spaced apart from the first dichroic mirror DM1 while facing the second surface of the first dichroic mirror DM1, and the third dichroic mirror DM3 is spaced apart from the second dichroic mirror DM2 while facing the second surface of the second dichroic mirror DM2. Here, the chromatic aberration of the diffractive optical lens element DL may be offset by adjusting the distance between the first dichroic mirror DM1 and the second dichroic mirror DM2 and the distance between the second dichroic mirror DM2 and the third dichroic mirror DM3.

In FIGS. 1 and 5, the first to third dichroic mirrors DM1 to DM3 are illustrated as having a flat plate shape. However, reflective surfaces of the first to third dichroic mirrors DM1 to DM3 may be curved. For example, the reflective surfaces of the first to third dichroic mirrors DM1 to DM3 may be concave or convex.

Figure 6:
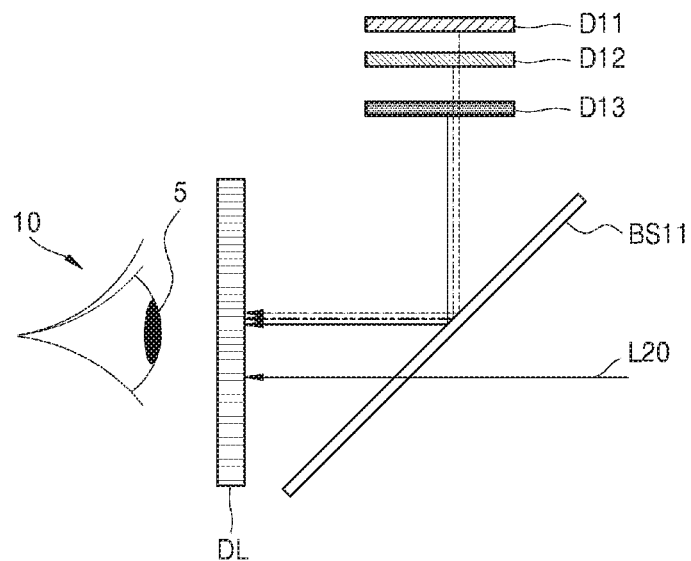
FIG. 6 is a view illustrating an optical structure equivalent to the multi-image display apparatuses shown in FIGS. 1 and 5.

FIG. 6 illustrates an optical structure equivalent to the multi-image display apparatuses shown in FIGS. 1 and 5. In FIG. 6, only an optical structure for offsetting the chromatic aberration of the diffractive optical lens element DL is illustrated for ease of illustration. Referring to FIG. 6, the multi-image display apparatuses shown in FIGS. 1 and 5 provide the same effect as the case in which a red display panel D11 configured to form a red image L11, a green display panel D12 configured to form a green image L12, and a blue display panel D13 configured to form a blue image L13 are arranged at different depth positions. The chromatic aberration of the diffractive optical lens element DL may be offset by adjusting the depth positions of the red display panel D11, the green display panel D12, and the blue display panel D13 in the optical path of the first image L10.

Figure 7:
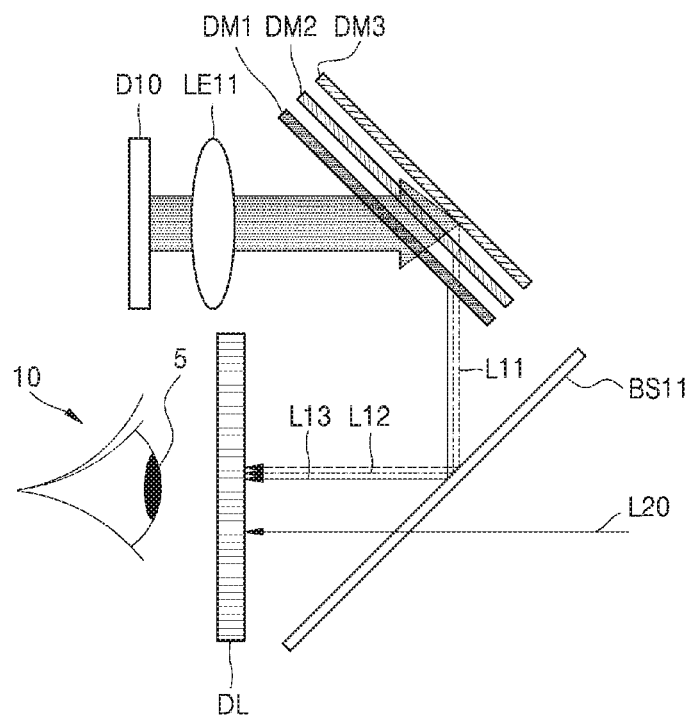
FIG. 7 is a schematic view illustrating a configuration of a multi-image display apparatus according to an example embodiment.

FIG. 7 is a schematic view illustrating a configuration of a multi-image display apparatus according to an example embodiment. Referring to FIG. 7, the multi-image display apparatus includes a display panel D10 as an image forming device configured to form a first image L10. An optical system OS may include a first dichroic mirror DM1, a second dichroic mirror DM2, and a third dichroic mirror DM3. The first to third dichroic mirrors DM1 to DM3 may operate as only a color separating element. For example, the first dichroic mirror DM1 may be configured to reflect a red image L11 to a beam splitter BS11 and transmit a green image L12 and a blue image L13, the second dichroic mirror DM2 may be configured to reflect the green image L12 to the beam splitter BS11 and transmit the blue image L13, and the third dichroic mirror DM3 may be configured to reflect the blue image L13 to the beam splitter BS11.

The beam splitter BS11 may be configured to reflect the first image L10 to a diffractive optical lens element DL and transmit a second image L20. For example, the beam splitter BS11 may be a half mirror or a polarization beam splitter. The optical system OS may further include the first polarizing plate LP10 and the second polarizing plate LP11 that are illustrated in FIG. 5 such that the first image L10 and the second image L20 may have different polarization components. For example, the second polarizing plate LP11 may be placed in an optical path of the first image L10 between the display panel D10 and the beam splitter BS11, and the first polarizing plate LP10 may be placed in an optical path of the second image L20 at a side opposite the diffractive optical lens element DL based on the beam splitter BS11. The optical path of the first image L10 between the display panel D10 and the diffractive optical lens element DL may be bent by about 180° because of the first to third dichroic mirrors DM1 to DM3 and the beam splitter BS11.

To offset the chromatic aberration of the diffractive optical lens element DL, the first to third dichroic mirrors DM1 to DM3 may be sequentially arranged in a direction away from the diffractive optical lens element DL and the beam splitter BS11. For example, the first dichroic mirror DM1 is closest to the diffractive optical lens element DL. The second dichroic mirror DM2 is spaced apart from the first dichroic mirror DM1, and the third dichroic mirror DM3 is spaced apart from the second dichroic mirror DM2 and may be farthest from the beam splitter BS11. Here, the chromatic aberration of the diffractive optical lens element DL may be offset by adjusting the distance between the first dichroic mirror DM1 and the second dichroic mirror DM2 and the distance between the second dichroic mirror DM2 and the third dichroic mirror DM3.

In addition, the optical system OS may further include a lens element LE10 placed between the display panel D10 and the first dichroic mirror DM1 to focus the first image L10. Based on the lens element LE10 and the first to third dichroic mirrors DM1 to DM3, the red image L11, the green image L12, and the blue image L13 may be focused at different positions in an optical path.

Figure 8:
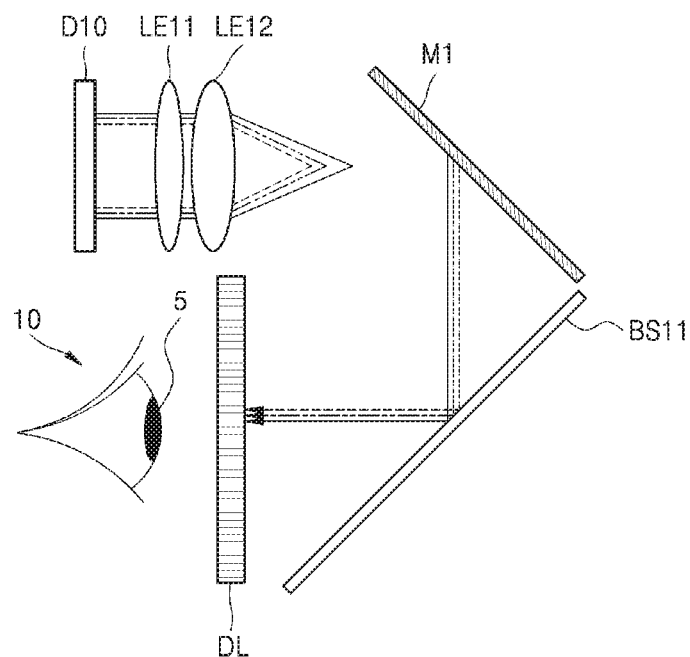
FIG. 8 is a schematic view illustrating a configuration of a multi-image display apparatus according to an example embodiment.

FIG. 8 is a schematic view illustrating a configuration of a multi-image display apparatus according to an example embodiment. Referring to FIG. 8, the multi-image display apparatus includes a display panel D10 as an image forming device configured to form a first image L10. An optical system OS uses a high-dispersion convex lens as a color separating element instead of using three dichroic mirrors. For example, the optical system OS may include: a beam splitter BS11 configured to reflect the first image L10 to a diffractive optical lens element DL and transmit a second image L20; a first lens element LE11 placed in an optical path of the first image L10 between the display panel D10 and the beam splitter BS11; and a second lens element LE12 placed in the optical path of the first image L10 between the display panel D10 and the beam splitter BS11. For example, the beam splitter BS11 may be a half mirror or a polarization beam splitter. The optical system OS may further include the first polarizing plate LP10 and the second polarizing plate LP11 that are illustrated in FIG. 5 such that the first image L10 and the second image L20 may have different polarization components.

The first lens element LE11 may focus the first image L10. The second lens element LE12 is a convex lens having a dispersion value greater than that of the first lens element LE11 and operates as a color separating element configured to split the first image L10 into a red image L11, a green image L12, and a blue image L13. Based on the first lens element LE11 and the second lens element LE12, the red image L11, the green image L12, and the blue image L13 may be focused at different positions in an optical path. The positions at which the red image L11, the green image L12, and the blue image L13 are focused may be mainly determined by the dispersion value of the second lens element LE12. Therefore, the chromatic aberration of the diffractive optical lens element DL may be offset by adjusting the dispersion value of the second lens element LE12.

In addition, the optical system OS may further include a mirror M1 placed in the optical path of the first image L10 between the display panel D10 and the beam splitter BS11 to reflect the first image L10 to the beam splitter BS11. The optical path of the first image L10 between the display panel D10 and the diffractive optical lens element DL may be bent by about 180° because of the mirror M1 and the beam splitter BS11. However, the mirror M1 may not be used, and the display panel D10 may be placed to directly face the beam splitter BS11. In this case, the optical path of the first image L10 may be bent by the beam splitter BS11 by about 90°.

Figure 9:
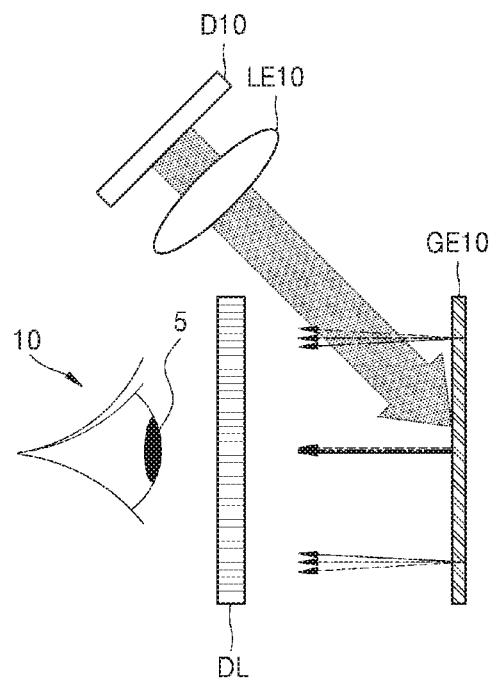
FIG. 9 is a schematic view illustrating a configuration of a multi-image display apparatus according to an example embodiment.

FIG. 9 is a schematic view illustrating a configuration of a multi-image display apparatus according to an example embodiment. Referring to FIG. 9, the multi-image display apparatus includes a display panel D10 as an image forming device configured to form a first image L10. An optical system OS uses a grating element GE10 as a color separating element. For example, the optical system OS may include the grating element GE10 facing a diffractive optical lens element DL, and a lens element LE10 placed in an optical path of the first image L10 between the display panel D10 and the grating element GE10. The display panel D10 and the lens element LE10 may be inclined with respect to the grating element GE10. In addition, the optical system OS may further include the first polarizing plate LP10 and the second polarizing plate LP11 that are illustrated in FIG. 5 such that the first image L10 and a second image L20 may have different polarization components.

The grating element GE10 may be manufactured in such a manner that the grating element GE10 may be configured as a concave mirror having a wavelength-dependent focal length with respect to the first image L10. In addition, the grating element GE10 may include a first surface configured to reflect the first image L10 and a second surface configured to transmit the second image L20. For example, the grating element GE10 may be configured such that at least a portion of the first image L10 incident on the first surface of the grating element GE10 is reflected to the diffractive optical lens element DL, and at least a portion of the second image L20 incident on the second surface of the grating element GE10 passes through the second surface and reaches the diffractive optical lens element DL. Therefore, the grating element GE10 may operate as a color separating element and a beam splitter as well.

Figure 10:
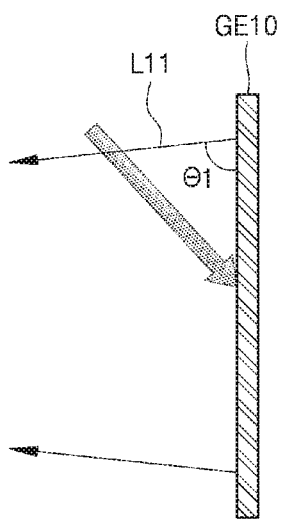
FIGS. 10 to 12 are views illustrating operations of a grating element of the multi-image display apparatus shown in FIG. 9.
Figure 11:
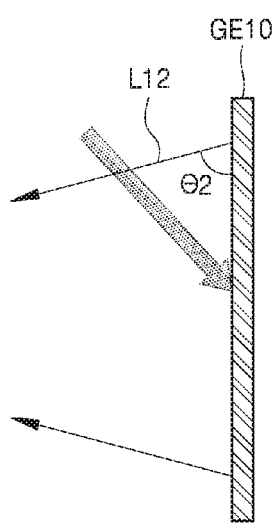
Figure 12:
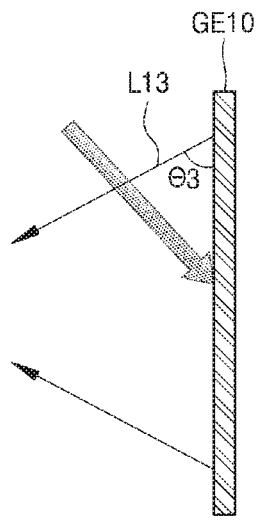

FIGS. 10 to 12 illustrate example operations of the grating element GE10 of the multi-image display apparatus shown in FIG. 9. Referring to FIG. 10, the grating element GE10 may converge the red image L11 at a first angle θ1 while reflecting the red image L11. In addition, referring to FIG. 11, the grating element GE10 may converge the green image L12 at a second angle θ2 greater than the first angle θ1 while reflecting the green image L12. In addition, referring to FIG. 12, the grating element GE10 may converge the blue image L13 at a third angle θ3 greater than the second angle θ2 while reflecting the blue image L13. Therefore, the grating element GE10 may have the shortest focal length with respect to the red image L11 and the longest focal length with respect to the blue image L13. The focal lengths of the grating element GE10 for the red image L11, the green image L12, and the blue image L13 are selected by considering the chromatic aberration of the diffractive optical lens element DL to offset the chromatic aberration.

For example, the grating element GE10 may include a surface relief grating or a volume grating being a hologram grating. The surface relief grating may be provided by forming a fine relief pattern on the first surface of the grating element GE10. The relief pattern of the surface relief grating may diffract incident light such that the diffracted light may be reflected at different angles according to the wavelength thereof. In addition, the hologram grating may be formed by applying object light and reference light onto a transparent photosensitive material to record an interference pattern. For example, while white light in which red light, green light, and blue light are mixed is applied as reference light onto a first surface of the photosensitive material at oblique angles, the red light diverging at a first angle θ1 may be applied onto the first surface of the photosensitive material as object light, the green light diverging at a second angle θ2 may be applied onto the first surface of the photosensitive material as object light, and the blue light diverging at a third angle θ3 may be applied onto the first surface of the photosensitive material as object light. Alternatively, object light and reference light may respectively be applied onto the first and second surfaces of the photosensitive material in perpendicular directions. Then, the object light and the reference light interfere with each other in the photosensitive material, and thus an interference pattern is recorded in the photosensitive material. Based on the interference pattern formed as described above, the grating element GE10 may perform the above-described operations.

Figure 13:
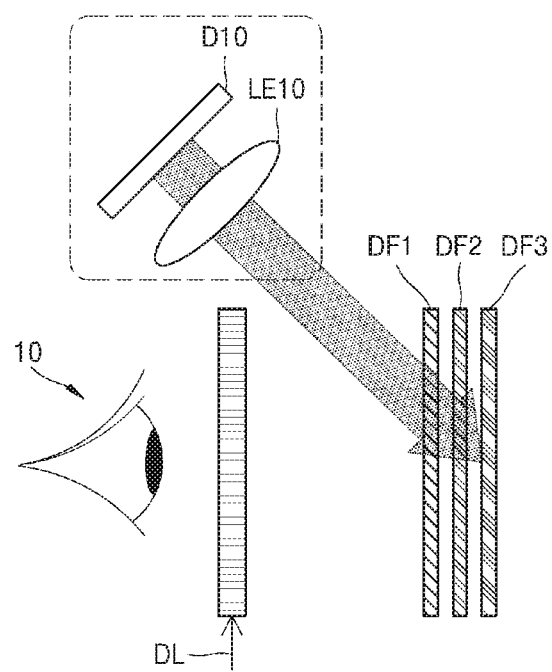
FIG. 13 is a schematic view illustrating a configuration of a multi-image display apparatus according to an example embodiment.

FIG. 13 is a schematic view illustrating a configuration of a multi-image display apparatus according to an example embodiment. Referring to FIG. 13, the multi-image display apparatus includes a display panel D10 as an image forming device configured to form a first image L10. An optical system OS uses three reflection-diffusion plates as color separating elements. For example, the optical system OS may include a first diffusion plate DF1 configured to reflect and diffuse a red image L11 toward a diffractive optical lens element DL and transmit a green image L12 and a blue image L13, a second diffusion plate DF2 configured to reflect and diffuse the green image L12 toward the diffractive optical lens element DL and transmit the blue image L13, and a third diffusion plate DF3 configured to reflect and diffuse the blue image L13 toward the diffractive optical lens element DL. In addition, the optical system OS may include a lens element LE10 placed in an optical path of the first image L10 between the display panel D10 and the first diffusion plate DF1. The display panel D10 and the lens element LE10 may be inclined with respect to the first diffusion plate DF1, and the first to third diffusion plates DF1 to DF3 may be parallel with the diffractive optical lens element DL. In addition, the optical system OS may further include the first polarizing plate LP10 and the second polarizing plate LP11 that are illustrated in FIG. 5 such that the first image L10 and a second image L20 may have different polarization components.

To transfer the second image L20 to the diffractive optical lens element DL, the first diffusion plate DF1 may include a first surface configured to reflect and diffuse the red image L11 and a second surface configured to transmit the second image L20, the second diffusion plate DF2 may include a first surface configured to reflect and diffuse the green image L12 and a second surface configured to transmit the second image L20, and the third diffusion plate DF3 may include a first surface configured to reflect and diffuse the blue image L13 and a second surface configured to transmit the second image L20. Therefore, the first to third diffusion plates DF1 to DF3 may operate as a color separating element and a beam splitter as well.

In addition, to offset the chromatic aberration of the diffractive optical lens element DL, the first to third diffusion plates DF1 to DF3 may be sequentially arranged in a direction away from the diffractive optical lens element DL. For example, the first diffusion plate DF1 may be closest to the diffractive optical lens element DL. The second diffusion plate DF2 may be spaced apart from the first diffusion plate DF1 while facing the second surface of the first diffusion plate DF1, and the third diffusion plate DF3 may be spaced apart from the second diffusion plate DF2 while facing the second surface of the second diffusion plate DF2. Here, the chromatic aberration of the diffractive optical lens element DL may be offset by adjusting the distance between the first diffusion plate DF1 and the second diffusion plate DF2 and the distance between the second diffusion plate DF2 and the third diffusion plate DF3.

Figure 14:
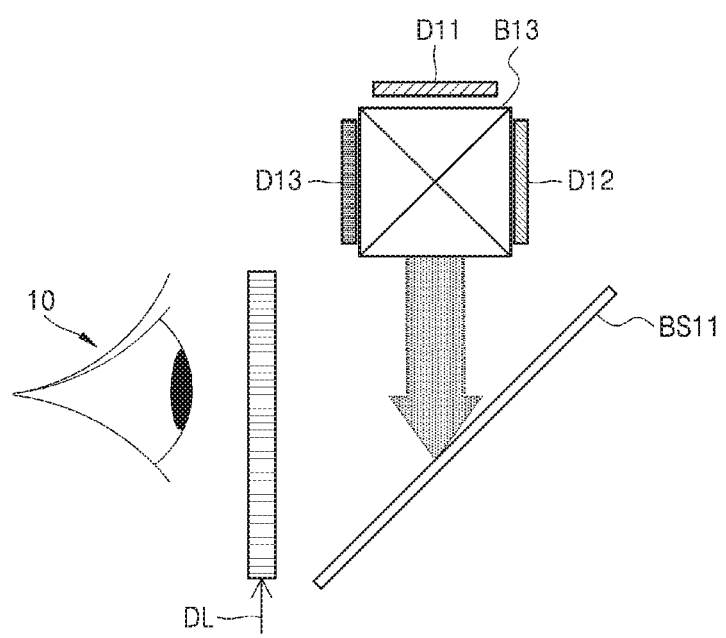
FIG. 14 is a schematic view illustrating a configuration of a multi-image display apparatus according to an example embodiment.

FIG. 14 is a schematic view illustrating a configuration of a multi-image display apparatus according to an example embodiment. Referring to FIG. 14, the multi-image display apparatus may include image forming devices configured to form a first image L10, that is, a first display panel D11 configured to form a red image L11, a second display panel D12 configured to form a green image L12, and a third display panel D13 configured to form a blue image L13. Therefore, since the red image L11, the green image L12, and the blue image L13 are separately generated, an optical system OS may not include an additional color separating element.

The optical system OS may include a first beam splitter BS13 configured to combine the red image L11, the green image L12, and the blue image L13 in one optical path for forming the first image L10, and a second beam splitter BS11 configured to reflect the first image L10 to a diffractive optical lens element DL and transmit a second image L20. In addition, the optical system OS may include a lens element LE10 placed in an optical path of the first image L10 between the first beam splitter BS13 and the second beam splitter BS11. The second beam splitter BS11 may be a half mirror or a polarization beam splitter. The optical system OS may further include the first polarizing plate LP10 and the second polarizing plate LP11 that are illustrated in FIG. 5 such that the first image L10 and the second image L20 may have different polarization components.

The first beam splitter BS13 may include a first entrance surface 13a facing the first display panel D11, a second entrance surface 13b facing the second display panel D12, a third entrance surface 13c facing the third display panel D13, and an exit surface 13d. For example, the first beam splitter BS13 may be an X-cube having a rectangular parallelepiped shape. Then, the red image L11 enters the first beam splitter BS13 through the first entrance surface 13a, and exits the first beam splitter BS13 through the exit surface 13d after being reflected by a reflective surface inside the first beam splitter BS13. The green image L12 enters the first beam splitter BS13 through the second entrance surface 13b, and exits the first beam splitter BS13 through the exit surface 13d after being reflected by another reflective surface inside the first beam splitter BS13. In addition, the blue image L13 enters the first beam splitter BS13 through the third entrance surface 13c, and exits the first beam splitter BS13 through the exit surface 13d after passing through the first beam splitter BS13. The second beam splitter BS11 faces the exit surface 13d of the first beam splitter BS13.

To offset the chromatic aberration of the diffractive optical lens element DL, the first to third display panels D11 to D13 may be arranged at different distances from the first beam splitter BS13. For example, a second distance between the second display panel D12 and the second entrance surface 13b may be greater than a first distance between the first display panel D11 and the first entrance surface 13a, and a third distance between the third display panel D13 and the third entrance surface 13c may be greater than the second distance between the second display panel D12 and the second entrance surface 13b. Therefore, the first distance between the first display panel D11 and the first entrance surface 13a may be the smallest, and the third distance between the third display panel D13 and the third entrance surface 13c may be the largest. In particular, the first distance may be zero (0). In other words, the first display panel D11 and the first entrance surface 13a may be in direct contact with each other. The chromatic aberration of the diffractive optical lens element DL may be offset by adjusting the first distance between the first display panel D11 and the first entrance surface 13a, the second distance between the second display panel D12 and the second entrance surface 13b, and the third distance between the third display panel D13 and the third entrance surface 13c.

Figure 15:
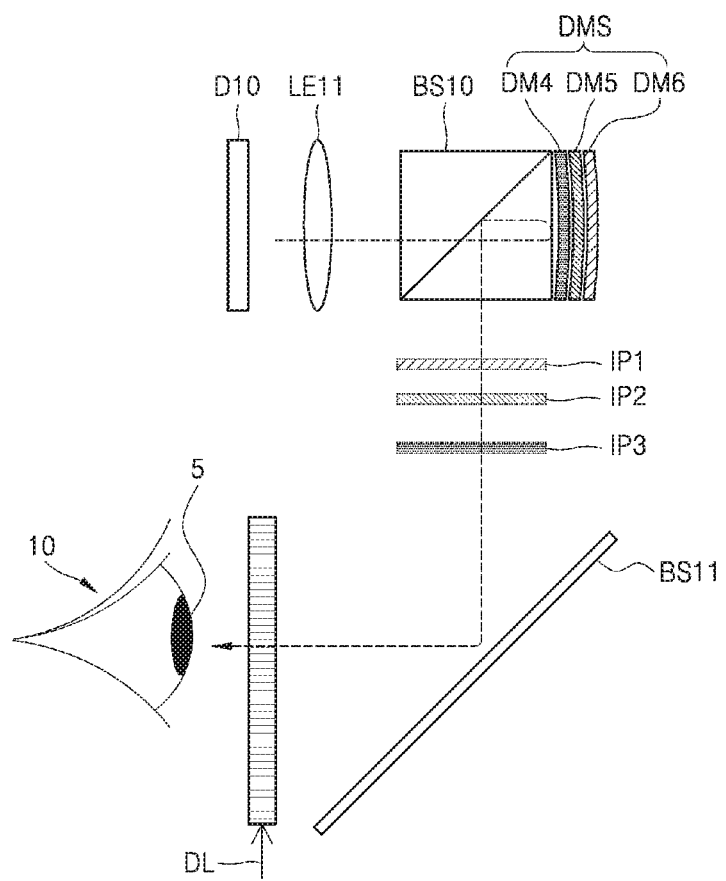
FIG. 15 is a schematic view illustrating a configuration of a multi-image display apparatus according to an example embodiment.

FIG. 15 is a schematic view illustrating a configuration of a multi-image display apparatus according to an example embodiment. Referring to FIG. 15, the multi-image display apparatus may include a display panel D10 as an image forming device configured to form a first image L10. An optical system OS may include a dichroic mirror stack DMS facing the display panel D10, a first beam splitter BS10 between the display panel D10 and the dichroic mirror stack DMS, and a second beam splitter BS11 configured to reflect the first image L10 to a diffractive optical lens element DL and transmit a second image L20. In addition, the optical system OS may further include a lens element LE11 between the display panel D10 and the first beam splitter BS10.

The first beam splitter BS10 and the second beam splitter BS11 may be half mirrors or polarization beam splitters configured to reflect a first linear polarization component of light and transmit a second linear polarization component of the light. If the first beam splitter BS10 and the second beam splitter BS11 are half mirrors, the optical system OS may further include the first polarizing plate LP10 and the second polarizing plate LP11 that are illustrated in FIG. 5 such that the first image L10 and a second image L20 may have different polarization components. If the first beam splitter BS10 is a polarization beam splitter, the optical system OS may further include a first wave plate WP10 between the dichroic mirror stack DMS and the first beam splitter BS10. In addition, if the first beam splitter BS10 is a polarization beam splitter and the second beam splitter BS11 is a half mirror, the optical system OS may include a first polarizing plate LP10 facing the second beam splitter BS11 and placed in an optical path of the second image L20.

In addition, the dichroic mirror stack DMS may include a first dichroic concave mirror DM4 configured to reflect and condense a red image L11 and transmit a green image L12 and a blue image L13, a second dichroic concave mirror DM5 configured to reflect and condense the green image L12 and transmit the blue image L13, and a third dichroic concave mirror DM6 configured to reflect and condense the blue image L13. Since the first to third dichroic concave mirrors DM4 to DM6 may condense reflected light, the red image L11, the green image L12, and the blue image L13 may be focused on different first, second, and third image planes IP1, IP2, and IP3 by cooperative operations of the lens element LE11 and the first to third dichroic concave mirrors DM4 to DM6. Therefore, the degree of design freedom of the multi-image display apparatus may be improved, and it is possible to effectively select positions at which the red image L11, the green image L12, and the blue image L13 are to be formed.

To offset the chromatic aberration of the diffractive optical lens element DL, the first to third dichroic concave mirrors DM4 to DM6 may be sequentially arranged in a direction away from the first beam splitter BS10. For example, the first dichroic concave mirror DM4 is closest to the first beam splitter BS10. The second dichroic concave mirror DM5 may be placed above the first dichroic concave mirror DM4, and the third dichroic concave mirror DM6 may be placed above the second dichroic concave mirror DM5. Here, the distances between the first to third dichroic concave mirrors DM4 to DM6 and the focal length of the lens element LE11 are determined by considering the chromatic aberration of the diffractive optical lens element DL to offset the chromatic aberration.

Figure 16:
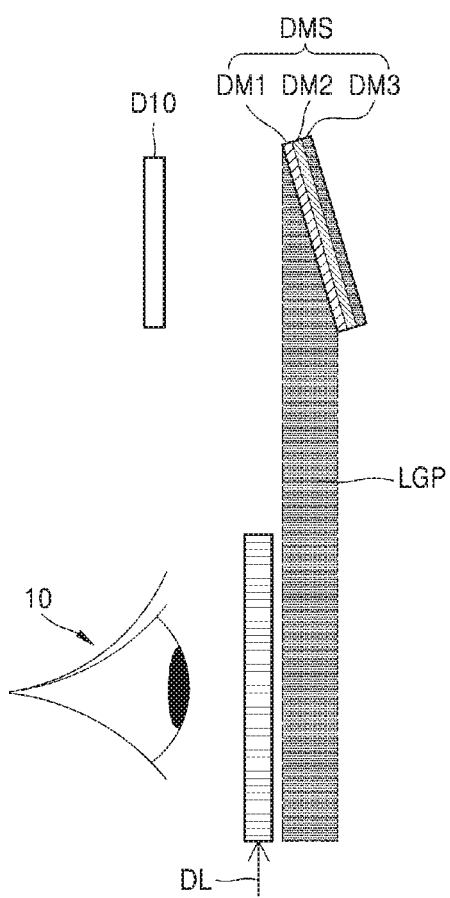
FIG. 16 is a schematic view illustrating a configuration of a multi-image display apparatus according to an example embodiment.

FIG. 16 is a schematic view illustrating a configuration of a multi-image display apparatus according to an example embodiment. Referring to FIG. 16, the multi-image display apparatus may include a display panel D10 as an image forming device configured to form a first image L10. An optical system OS may include a dichroic mirror stack DMS and a light guide plate LGP. The light guide plate LGP may include a first entrance surface S1 on which the first image L10 is incident, a second entrance surface S2 on which a second image L20 is incident, an exit surface S3 through which the first image L10 and the second image L20 are output, and an inclined surface S4 facing the first entrance surface S1. The display panel D10 may face the first entrance surface S1 of the light guide plate LGP. In addition, the optical system OS may further include a lens element LE10 between the display panel D10 and the first entrance surface S1 of the light guide plate LGP. The optical system OS may further include a first polarizing plate LP10 as illustrated in FIG. 5, facing the second entrance surface S2, and a second polarizing plate LP11 as illustrated in FIG. 5, placed between the display panel D10 and the first entrance surface S1 such that the first image L10 and the second image L20 may have different polarization components.

As illustrated in FIG. 16, the first entrance surface S1 and the inclined surface S4 face each other, and the second entrance surface S2 and the exit surface S3 face each other. In addition, the first entrance surface S1 and the exit surface S3 are located in different regions of a first side of the light guide plate LGP, and the second entrance surface S2 and the inclined surface S4 are located in different regions of a second side of the light guide plate LGP opposite the first side of the light guide plate LGP. In this configuration, the first image L10 entering the light guide plate LGP through the first entrance surface S1 is obliquely reflected by the inclined surface S4 and propagates inside the light guide plate LGP while being totally reflected inside the light guide plate LGP. Then, the first image L10 may exit the light guide plate LGP through the exit surface S3 and reach the diffractive optical lens element DL. Therefore, the light guide plate LGP may transfer the first image L10 from the first entrance surface S1 to the exit surface S3. A diffractive grating may be formed on the exit surface S3 to output the first image L10. The diffractive optical lens element DL faces the exit surface S3. For example, the diffractive optical lens element DL may be attached to the exit surface S3. In addition, the second image L20 entering the light guide plate LGP through the second entrance surface S2 may intactly pass through the light guide plate LGP, and may then exit the light guide plate LGP through the exit surface S3 and reach the diffractive optical lens element DL.

The dichroic mirror stack DMS may include a first dichroic mirror DM1 configured to reflect a red image L11 and transmit a green image L12 and a blue image L13, a second dichroic mirror DM2 configured to reflect the green image L12 and transmit the blue image L13, and a third dichroic mirror DM3 configured to reflect the blue image L13. To offset the chromatic aberration of the diffractive optical lens element DL, the first to third dichroic mirrors DM1 to DM3 may be sequentially arranged in a direction away from the inclined surface S4 of the light guide plate LGP. In other words, the first dichroic mirror DM1 is closest to the inclined surface S4. For example, the first dichroic mirror DM1 may be attached to the inclined surface S4. The second dichroic mirror DM2 may be placed above the first dichroic mirrors DM1, and the third dichroic mirror DM3 may be placed above the second dichroic mirror DM2. Here, the distances between the first to third dichroic mirrors DM1 to DM3 are determined by considering the chromatic aberration of the diffractive optical lens element DL to offset the chromatic aberration.

Figure 17:
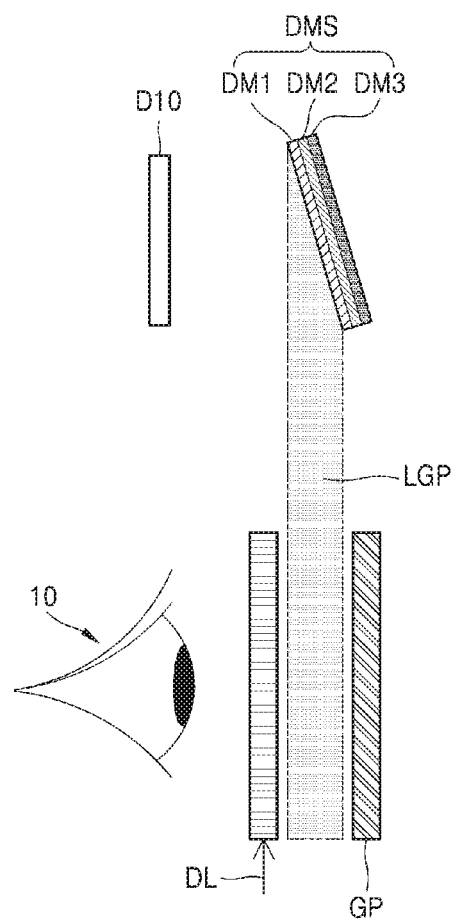
FIG. 17 is a schematic view illustrating a configuration of a multi-image display apparatus according to an example embodiment.

FIG. 17 is a schematic view illustrating a configuration of a multi-image display apparatus according to an example embodiment. The multi-image display apparatus shown in FIG. 17 is different from the multi-image display apparatus shown in FIG. 16, in that an optical system OS further includes a diffractive grating GP. The other elements of the multi-image display apparatus shown in FIG. 17 are the same as those of the multi-image display apparatus shown in FIG. 16. The diffractive grating GP is placed above a second entrance surface S2 of a light guide plate LGP to reflect a first image L10 perpendicularly toward an exit surface S3 of the light guide plate LGP. Then, the first image L10 may pass through the exit surface S3 substantially without or with less loss and may then reach a diffractive optical lens element DL. In addition, the diffractive grating GP may be configured to intactly transmit a second image L20.

Figure 18:
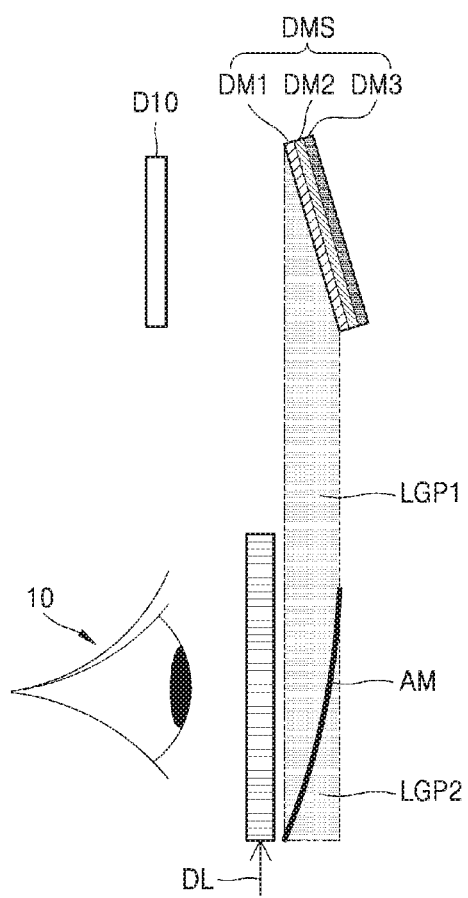
FIG. 18 is a schematic view illustrating a configuration of a multi-image display apparatus according to an example embodiment.

FIG. 18 is a schematic view illustrating a configuration of a multi-image display apparatus according to an example embodiment. The multi-image display apparatus shown in FIG. 18 is different from the multi-image display apparatus shown in FIG. 16, in that an optical system OS further includes a half mirror AM inside a light guide plate LGP. The other elements of the multi-image display apparatus shown in FIG. 18 are the same as those of the multi-image display apparatus shown in FIG. 16. The half mirror AM is placed inside the light guide plate LGP and faces a second entrance surface S2 and an exit surface S3. The half mirror AM may be configured to reflect a portion of a first image L10 perpendicularly toward the exit surface S3 of the light guide plate LGP and transmit without change a second image L20. In addition, the half mirror AM may have an aspherical reflective surface to efficiently condense the first image L10 without distortion.

To place the half mirror AM inside the light guide plate LGP, the light guide plate LGP may include a first light guide plate portion LGP1 and a second light guide plate portion LGP2. The first light guide plate portion LGP1 includes a first entrance surface S1, the exit surface S3, and an inclined surface S4, and the second light guide plate portion LGP2 includes the second entrance surface S2. The light guide plate LGP may be manufactured by bonding the first light guide plate portion LGP1 and the second light guide plate portion LGP2 to each other. When the first light guide plate portion LGP1 and the second light guide plate portion LGP2 are bonded together, bonding surfaces of the first light guide plate portion LGP1 and the second light guide plate portion LGP2 may be coated with a half mirror material to form the half mirror AM inside the light guide plate LGP.

Figure 19:
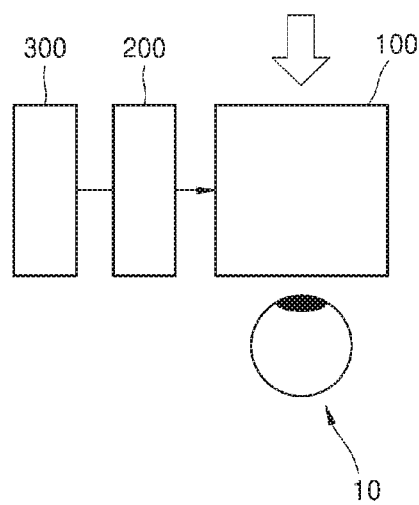
FIG. 19 is a schematic block diagram illustrating an overall configuration of a multi-image display apparatus according to an example embodiment.

FIG. 19 is a schematic block diagram illustrating an overall configuration of a multi-image display apparatus according to an example embodiment. Referring to FIG. 19, the multi-image display apparatus may include an optical system 100, an image forming device 200, and a controller 300. The optical system 100 may be one of the various optical systems OS described with reference to FIGS. 1 to 18. The image forming device 200 may, for example, include a light source LS10 and a spatial light modulator SLM, or may include a display panel D10, D11, D12, or D13. An ocular organ 10 of a user may face the optical system 100. The controller 300 may be connected to the image forming device 200 and may control the image forming device 200. The controller 300 may include a processor such as a central processing unit (CPU). The multi-image display apparatus may further include an input unit and output unit for a user interface.

Figure 20:
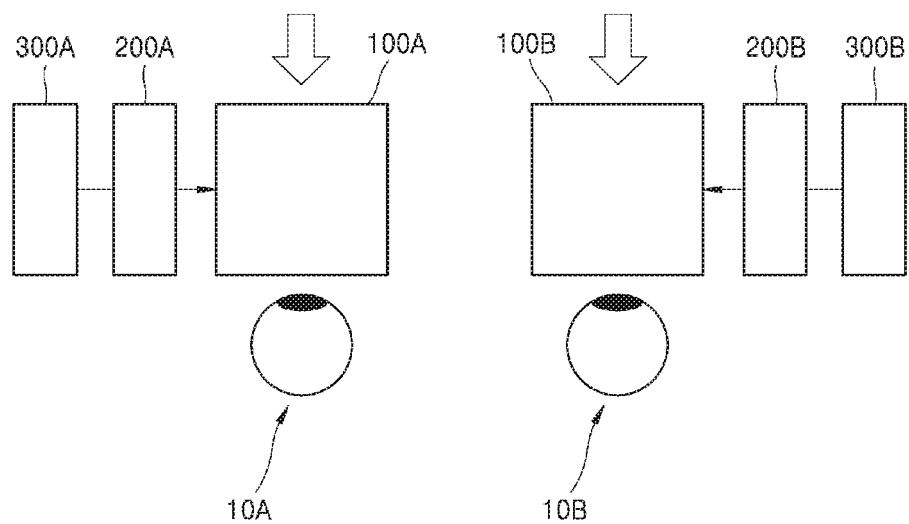
FIG. 20 is a schematic block diagram illustrating an overall configuration of a multi-image display apparatus according to an example embodiment.

FIG. 20 is a schematic block diagram illustrating an overall configuration of a multi-image display apparatus according to an example embodiment. A pair of such structures as shown in FIG. 19 may be provided in a left-right symmetrical manner. An example thereof is illustrated in FIG. 20. Referring to FIG. 20, the multi-image display apparatus may include a first optical system 100A, and a first image forming device 200A and a first controller 300A corresponding to the first optical system 100A. In addition, the multi-image display apparatus may include a second optical system 100B spaced apart from the first optical system 100A, and a second image forming device 200B and a second controller 300B corresponding to the second optical system 100B. The first optical system 100A may be placed corresponding to a first ocular organ 10A of a user, and the second optical system 100B may be placed corresponding to a second ocular organ 10B of the user. For example, the first ocular organ 10A may be the left eye of the user, and the second ocular organ 10B may be the right eye of the user. Therefore, the configuration shown in FIG. 20 may be applied to a binocular multi-image display apparatus.

Figure 21:
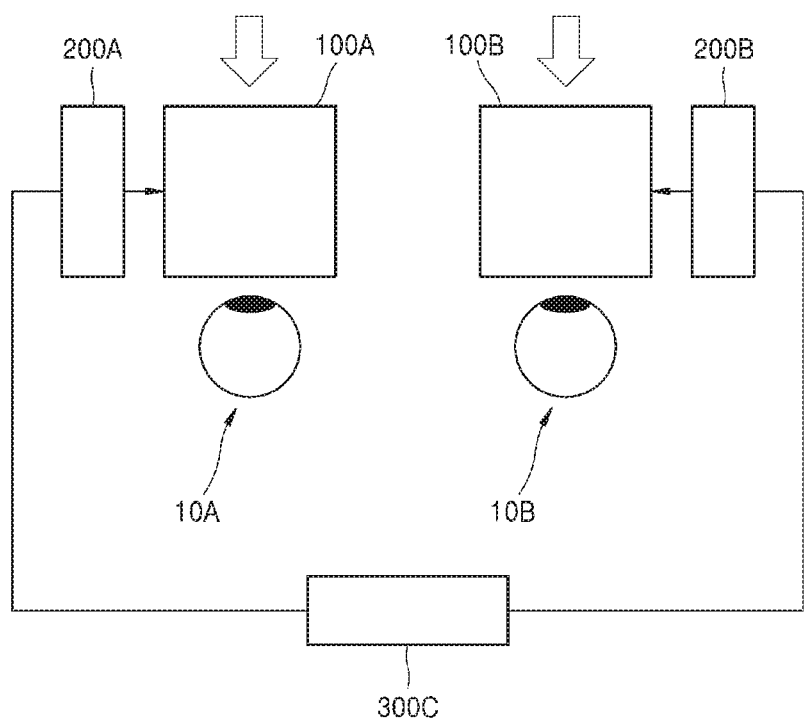
FIG. 21 is a schematic block diagram illustrating an overall configuration of a multi-image display apparatus according to an example embodiment.

FIG. 21 is a schematic block diagram illustrating an overall configuration of a multi-image display apparatus according to an example embodiment. In the multi-image display apparatus shown in FIG. 20, the first controller 300A and the second controller 300B may not be separately manufactured but may be combined as one controller. Referring to FIG. 21, first and second image forming devices 200A and 200B may be connected to one controller 300C. Furthermore, in some cases, the controller 300C may be connected to the image forming devices 200A and 200B in a wireless manner, not in a wired manner.

Figure 22:
FIGS. 22 to 24 are views illustrating various electronic devices to which the multi-image display apparatuses shown in FIGS. 19 to 21 are applicable.
Figure 23:
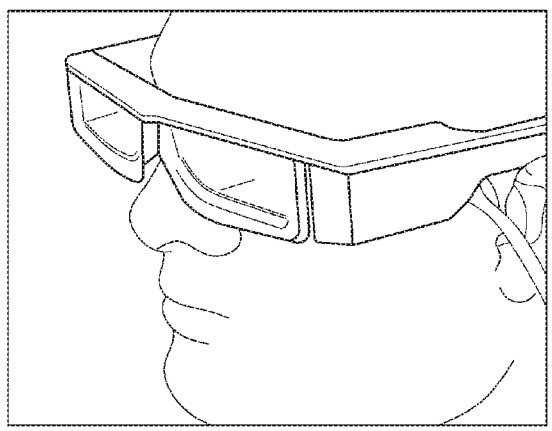
Figure 24:
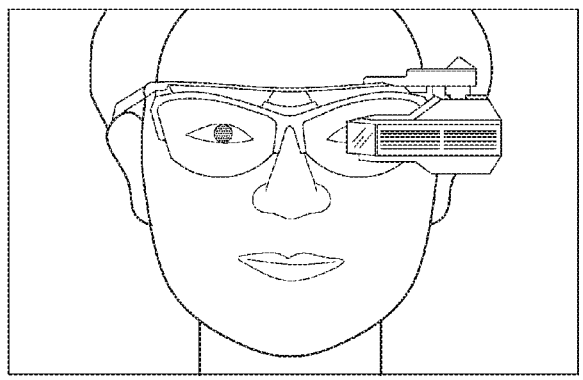

FIGS. 22 to 24 illustrate various electronic devices to which the multi-image display apparatuses shown in FIGS. 19 to 21 are applicable. As illustrated in FIGS. 22 to 24, at least parts of the multi-image display apparatuses of the various example embodiments may constitute wearable devices. In other words, the multi-image display apparatuses may be applied to wearable devices. For example, the multi-image display apparatuses may be applied to head mounted displays (HMDs). In addition, the multi-image display apparatuses may be applied to glasses-type displays or goggle-type displays. The wearable electronic devices shown in FIGS. 22 to 24 may be operated in an interacting relationship with smartphones.

In addition, the multi-image display apparatuses of the various example embodiments may be included in smartphones, and the smart phones may be used as multi-image display apparatuses. In other words, the multi-image display apparatuses may be applied to compact electronic devices or mobile electronic devices, not to such wearable devices as shown in FIGS. 22 to 24. The application fields of the multi-image display apparatuses of the various embodiments may vary in various ways. For example, the multi-image display apparatuses of the various example embodiments may be not only used to implement AR or MR, but also used in other fields. In other words, the technical concepts of the various example embodiments may be applied not only to AR or MR, but also to displays through which a plurality of images can be simultaneously seen.

It should be understood that the multi-image display apparatuses including the diffractive optical lens elements described according to example embodiments should be considered in a descriptive sense only and not for purposes of limitation.

While one or more example embodiments have been described with reference to the figures, it will be understood by those of ordinary skill in the art that various changes in form and details may be made therein without departing from the spirit and scope as defined by the following claims.

What is claimed is:

1. A multi-image display apparatus comprising:
   a diffractive optical lens element having a focal length varying based on a wavelength and a polarization state of incident light;
   an image forming device configured to form a first image comprising a first color image, a second color image, and a third color image; and
   an optical system configured:
      to transfer the first image and a second image to the diffractive optical lens element, the second image being transferred along a second optical path different from a first optical path along which the first image is transferred, and
      to offset chromatic aberration of the diffractive optical lens element by providing different optical path lengths for the first color image, the second color image, and the third color image.

2. The multi-image display apparatus of claim 1, wherein the diffractive optical lens element is further configured to condense light having a first polarization state and transmit without refraction, light having a second polarization state.

3. The multi-image display apparatus of claim 2, wherein the optical system is further configured to polarize the first image and the second image, such that the first image is incident on the diffractive optical lens element in the first polarization state and the second image is incident on the diffractive optical lens element in the second polarization state.

4. The multi-image display apparatus of claim 1, wherein the diffractive optical lens element has a first focal length with respect to the first color image, a second focal length with respect to the second color image that is greater than the first focal length, and a third focal length with respect to the third color image that is greater than the second focal length,
   wherein the first color image has a first optical path length, the second color image has a second optical path length that is greater than the first optical path length, and the third color image has a third optical path length that is greater than the second optical path length.

5. The multi-image display apparatus of claim 1, wherein along the first optical path of the first image, the optical system focuses the first color image at a first position with respect to the diffractive optical lens element, the second color image at a second position farther away from the diffractive optical lens element than the first position, and the third color image at a third position farther away from the diffractive optical lens element than the second position,
   wherein the diffractive optical lens element is configured to focus the first color image, the second color image, and the third color image on a same plane.

6. The multi-image display apparatus of claim 1, wherein the optical system comprises:
   a first beam splitter configured to transmit or reflect incident light based on a polarization state of the incident light;
   a dichroic mirror stack facing a first surface of the first beam splitter;
   a lens facing a second surface of the first beam splitter and configured to focus the first color image, the second color image, and the third color image reflected from the dichroic mirror stack at different positions along the first optical path of the first image; and
   a second beam splitter configured to reflect the first image to the diffractive optical lens element and transmit the second image to the diffractive optical lens element.

7. The multi-image display apparatus of claim 6, wherein the image forming device comprises:
   a light source facing a third surface of the first beam splitter, the third surface being opposite to the second surface of the first beam splitter; and
   a spatial light modulator facing a fourth surface of the first beam splitter, the fourth surface being opposite to the first surface of the first beam splitter.

8. The multi-image display apparatus of claim 6, wherein the dichroic mirror stack comprises:
   a first dichroic mirror, disposed on the first surface of the beam splitter, configured to reflect the first color image and transmit the second color image and the third color image;
   a second dichroic mirror, disposed on the first dichroic mirror, configured to reflect the second color image and transmit the third color image; and
   a third dichroic mirror, disposed on the second dichroic mirror, configured to reflect the third color image,
   wherein the first to third dichroic mirrors are sequentially disposed in a direction away from the first surface of the beam splitter.

9. The multi-image display apparatus of claim 6, wherein the optical system further comprises a quarter-wave plate between the first beam splitter and the dichroic mirror stack.

10. The multi-image display apparatus of claim 6, wherein the optical system further comprises a quarter-wave plate between the second beam splitter and the diffractive optical lens element.

11. The multi-image display apparatus of claim 6, wherein the optical system further comprises a polarizing plate disposed in an optical path of the second image to select a polarization state of the second image incident on the second beam splitter.

12. The multi-image display apparatus of claim 1, wherein the image forming device comprises a display panel.

13. The multi-image display apparatus of claim 12, wherein the optical system comprises:
- a first dichroic mirror configured to reflect the first color image to the diffractive optical lens element and transmit the second color image and the third color image;
- a second dichroic mirror configured to reflect the second color image to the diffractive optical lens element and transmit the third color image; and
- a third dichroic mirror configured to reflect the third color image to the diffractive optical lens element,
- wherein the first to third dichroic mirrors are sequentially disposed in a direction away from the diffractive optical lens element.

14. The multi-image display apparatus of claim 13, wherein the second dichroic mirror is spaced apart from the first dichroic mirror, and the third dichroic mirror is spaced apart from the second dichroic mirror.

15. The multi-image display apparatus of claim 13, wherein the first dichroic mirror comprises a first surface reflecting the first color image and a second surface transmitting the second image,
- the second dichroic mirror comprises a first surface reflecting the second color image and a second surface transmitting the second image, and
- the third dichroic mirror comprises a first surface reflecting the third color image and a second surface transmitting the second image.

16. The multi-image display apparatus of claim 12, wherein the optical system comprises:
- a beam splitter configured to reflect the first image to the diffractive optical lens element and transmit the second image;
- a first dichroic mirror configured to reflect the first color image to the beam splitter and transmit the second color image and the third color image;
- a second dichroic mirror configured to reflect the second color image to the beam splitter and transmit the third color image; and
- a third dichroic mirror configured to reflect the third color image to the beam splitter,
- wherein the first to third dichroic mirrors are sequentially disposed in a direction away from the diffractive optical lens element.

17. The multi-image display apparatus of claim 16, wherein the first to third dichroic mirrors are sequentially disposed in a direction away from the beam splitter, and
- wherein the second dichroic mirror is spaced apart from the first dichroic mirror, and the third dichroic mirror is spaced apart from the second dichroic mirror.

18. The multi-image display apparatus of claim 16, further comprising a lens element disposed in an optical path of the first image between the image forming device and the beam splitter,
- wherein the lens element is configured to focus the first color image, the second color image, and the third color image at different positions in the optical path of the first image.

19. The multi-image display apparatus of claim 12, wherein the optical system comprises:
- a beam splitter configured to reflect the first image to the diffractive optical lens element and transmit the second image;
- a first lens element disposed in an optical path of the first image between the image forming device and the beam splitter and configured to focus the first image; and
- a second lens element disposed in the optical path of the first image between the image forming device and the beam splitter,
- wherein the second lens element comprises a dispersion value greater than a dispersion value of the first lens element and configured to split the first image into the first color image, the second color image, and the third color image.

20. The multi-image display apparatus of claim 19, wherein the dispersion value of the second lens element is determined to offset chromatic aberration of the diffractive optical lens element.

21. The multi-image display apparatus of claim 19, wherein the optical system further comprises a mirror disposed in the optical path of the first image between the image forming device and the beam splitter,
- wherein the mirror is configured to reflect the first image to the beam splitter.

22. The multi-image display apparatus of claim 12, wherein the optical system comprises a grating element configured to reflect the first image to the diffractive optical lens element and transmit the second image,
- wherein the grating element is configured to converge the first color image at a first angle, the second color image at a second angle greater than the first angle, and the third color image at a third angle greater than the second angle.

23. The multi-image display apparatus of claim 22, wherein the grating element comprises a hologram grating or a surface relief grating.

24. The multi-image display apparatus of claim 12, wherein the optical system comprises:
- a first diffusion plate configured to reflect and diffuse the first color image toward the diffractive optical lens element and transmit the second color image and the third color image;
- a second diffusion plate configured to reflect and diffuse the second color image toward the diffractive optical lens element and transmit the third color image; and
- a third diffusion plate configured to reflect and diffuse the third color image toward the diffractive optical lens element,
- wherein the first to third diffusion plates are sequentially disposed in a direction away from the diffractive optical lens element.

25. The multi-image display apparatus of claim 24, wherein the second diffusion plate is spaced apart from the first diffusion plate, and the third diffusion plate is spaced apart from the second dichroic mirror.

26. The multi-image display apparatus of claim 24, wherein the first diffusion plate has a first surface reflecting and diffusing the first color image and a second surface transmitting the second image,
- the second diffusion plate has a first surface reflecting and diffusing the second color image and a second surface transmitting the second image, and
- the third diffusion plate has a first surface reflecting and diffusing the third color image and a second surface transmitting the second image.

27. The multi-image display apparatus of claim 12, wherein the optical system comprises:
- a dichroic mirror stack facing the display panel;
- a first beam splitter placed between the display panel and the dichroic mirror stack and configured to transmit or reflect incident light based on a polarization state of the incident light; and a second beam splitter configured to reflect the first image to the diffractive optical lens element and transmit the second image, wherein the dichroic mirror stack comprises:
- a first dichroic concave mirror configured to reflect and condense the first color image and transmit the second color image and the third color image;
- a second dichroic concave mirror configured to reflect and condense the second color image and transmit the third color image; and
- a third dichroic concave mirror configured to reflect and condense the third color image,
- wherein the first to third dichroic concave mirrors are sequentially disposed in a direction away from the first beam splitter.

28. The multi-image display apparatus of claim 12, wherein the optical system comprises:
- a light guide plate comprising:
  - a first entrance surface on which the first image is incident;
  - a second entrance surface on which the second image is incident;
  - an exit surface through which the first image and the second image are output; and
  - an inclined surface facing the first entrance surface,
  - wherein the light guide plate is configured to transfer light from the first entrance surface to the exit surface; and
- a dichroic mirror stack disposed on the inclined surface of the light guide plate.

29. The multi-image display apparatus of claim 28, wherein the dichroic mirror stack comprises:
- a first dichroic mirror configured to reflect the first color image and transmit the second color image and the third color image;
- a second dichroic mirror configured to reflect the second color image and transmit the third color image; and
- a third dichroic mirror configured to reflect the third color image,
- wherein the first to third dichroic mirrors are sequentially disposed in a direction away from the inclined surface of the light guide plate.

30. The multi-image display apparatus of claim 29, wherein the diffractive optical lens element is disposed on the exit surface of the light guide plate.

31. The multi-image display apparatus of claim 28, wherein the optical system further comprises a diffractive grating disposed on the second entrance surface of the light guide plate opposite the exit surface of the light guide plate,
- wherein the diffractive grating is configured to reflect incident light perpendicularly toward the exit surface of the light guide plate.

32. The multi-image display apparatus of claim 28, wherein the optical system further comprises a half mirror placed inside the light guide plate and facing the exit surface of the light guide plate, the half mirror comprising an aspherical reflective surface.

33. The multi-image display apparatus of claim 1, wherein the image forming device comprises:
- a first display panel configured to form the first color image;
- a second display panel configured to form the second color image; and
- a third display panel configured to form the third color image.

34. The multi-image display apparatus of claim 33, wherein the optical system comprises:

a first beam splitter configured in a rectangular parallelepiped shape, the first beam splitter comprising a first entrance surface facing the first display panel, a second entrance surface facing the second display panel, a third entrance surface facing the third display panel, and an exit surface; and
a second beam splitter configured to reflect the first image to the diffractive optical lens element and transmit the second image.

35. The multi-image display apparatus of claim 34, wherein a second distance between the second display panel and the second entrance surface is greater than a first distance between the first display panel and the first entrance surface, and a third distance between the third display panel and the third entrance surface is greater than the second distance between the second deposition and the second entrance surface.

36. The multi-image display apparatus of claim 7, wherein the optical system further comprises a second quarter-wave plate between the first beam splitter and the spatial light modulator.

37. A multi-image display apparatus comprising:
- a diffractive optical lens element having a focal length varying based on a wavelength of light;
- a first image forming device configured to form a first image comprising a first color image, a second color image, and a third color image;
- a second image forming device configured to form a second image; and
- an optical system configured to:
  - provide the first color image having a first optical path length, a second color image having a second optical path length, and the third color image having a third optical path length, the first, second, and third optical path lengths being of different lengths; and
  - to transfer the first image formed by the first image forming device and the second image formed by the second image forming device to the diffractive optical lens element,
- wherein the diffractive optical lens element is configured to focus the first color image, the second color image, and the third color image included in the first image on a same plane.

38. The multi-image display apparatus of claim 37, wherein the optical system comprises:
- a first beam splitter configured to transmit or reflect incident light based a polarization state of the incident light from the first image forming device;
- a dichroic mirror stack faces a first surface of the first beam splitter;
- a lens facing a second surface of the first beam splitter and configured to focus the first color image, the second color image, and the third color image reflected from the dichroic mirror stack at different positions along an optical path of the first image; and
- a second beam splitter configured to reflect the first image to the diffractive optical lens element and transmit the second image to the diffractive optical lens element.

39. The multi-image display apparatus of claim 38, wherein the dichroic mirror stack comprises:
- a first dichroic mirror, disposed on the first surface of the beam splitter, configured to reflect the first color image and transmit the second color image and the third color image;
- a second dichroic mirror, disposed on the first dichroic mirror, configured to reflect the second color image and transmit the third color image; and a third dichroic mirror, disposed on the second dichroic mirror, configured to reflect the third color image.

40. The multi-image display apparatus of claim 37, wherein the diffractive optical lens element has a first focal length with respect to the first color image, a second focal length with respect to the second color image that is greater than the first focal length, and a third focal length with respect to the third color image that is greater than the second focal length.

* * * * *